(12) United States Patent
Sato et al.

(10) Patent No.: US 12,228,764 B2
(45) Date of Patent: *Feb. 18, 2025

(54) OPTICAL ELEMENT AND LIGHT GUIDE ELEMENT

(71) Applicant: FUJIFILM Corporation, Tokyo (JP)

(72) Inventors: Hiroshi Sato, Minami-ashigara (JP); Yukito Saitoh, Minami-ashigara (JP); Ayako Muramatsu, Minami-ashigara (JP); Mayumi Nojiri, Minami-ashigara (JP); Hideyuki Nishikawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,887

(22) Filed: Jan. 29, 2024

(65) Prior Publication Data

US 2024/0168218 A1 May 23, 2024

Related U.S. Application Data

(63) Continuation of application No. 17/036,612, filed on Sep. 29, 2020, now Pat. No. 11,927,792, which is a
(Continued)

(30) Foreign Application Priority Data

Mar. 30, 2018 (JP) .................. 2018-067198

(51) Int. Cl.
*F21V 8/00* (2006.01)
*C09K 19/60* (2006.01)
(Continued)

(52) U.S. Cl.
CPC .......... *G02B 6/0056* (2013.01); *C09K 19/605* (2013.01); *G02B 5/208* (2013.01);
(Continued)

(58) Field of Classification Search
CPC .... G02B 6/0056; G02B 6/0026; G02B 6/005; G02B 5/208; G02B 5/3016; C09K 19/605
See application file for complete search history.

(56) References Cited

U.S. PATENT DOCUMENTS 11,927,792 B2 * 3/2024 Sato ..................... G02B 5/3083
2008/0278675 A1 11/2008 Escuti et al.
(Continued)

FOREIGN PATENT DOCUMENTS

JP 2008-532085 A 8/2008
JP 2010-111750 A 5/2010
(Continued)

OTHER PUBLICATIONS

U.S. Appl. No. 17/036,612, filed Sep. 29, 2020.
(Continued)

*Primary Examiner* — Tina M Wong
(74) *Attorney, Agent, or Firm* — Birch, Stewart, Kolasch & Birch, LLP

(57) ABSTRACT

An object of the present invention is to provide: an optical element in which incident light can be transmitted or reflected at an angle in the predetermined direction and the wavelength dependence of the amount of transmitted light or reflected light is small; and an optical element including the optical element. The optical element according to the present invention comprises: an optically-anisotropic layer that is formed using a composition including a liquid crystal compound and an infrared absorbing colorant, in which the optically-anisotropic layer has a liquid crystal alignment pattern in which a direction of an optical axis derived from the liquid crystal compound changes while continuously rotating in at least one in-plane direction, and an absorption of the infrared absorbing colorant in a wavelength range of 700 to 2000 nm in a minor axis direction is higher than an
(Continued)

absorption of the infrared absorbing colorant in a wavelength range of 700 to 2000 nm in a major axis direction.

16 Claims, 11 Drawing Sheets

Related U.S. Application Data continuation of application No. PCT/JP2019/014134, filed on Mar. 29, 2019.

(51) Int. Cl.
G02B 5/20 (2006.01)
G02B 5/30 (2006.01)

(52) U.S. Cl.
CPC ......... *G02B 5/3016* (2013.01); *G02B 6/0026* (2013.01); *G02B 6/005* (2013.01)

(56) References Cited

U.S. PATENT DOCUMENTS

| | | |
|---|---|---|
| 2010/0225876 A1 | 9/2010 | Escuti et al. |
| 2016/0011353 A1 | 1/2016 | Escuti et al. |
| 2016/0231568 A1 | 8/2016 | Saarikko et al. |
| 2018/0118865 A1 | 5/2018 | Arayama et al. |
| 2018/0164480 A1 | 6/2018 | Yoshida |
| 2019/0041561 A1 | 2/2019 | Goto |

FOREIGN PATENT DOCUMENTS

| | | |
|---|---|---|
| JP | 2010-525394 A | 7/2010 |
| JP | 2016-519327 A | 6/2016 |
| WO | WO 2016/194961 A1 | 12/2016 |
| WO | WO 2017/169920 A1 | 10/2017 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2019/014134, dated Oct. 15, 2020.
International Search Report (Form PCT/ISA/210) for International Application No. PCT/JP2019/014134, dated May 7, 2019.
Non-Final Office Action issued in U.S. Appl. No. 17/036,612, dated Jul. 14, 2023.
Notice of Allowance issued in U.S. Appl. No. 17/036,612, dated Nov. 1, 2023.

\* cited by examiner

OPTICAL ELEMENT AND LIGHT GUIDE ELEMENT

CROSS-REFERENCE TO RELATED APPLICATIONS

This application is a Continuation of co-pending application Ser. No. 17/036,612, filed on Sep. 29, 2020, which is a Continuation of PCT International Application No. PCT/JP2019/014134, filed on Mar. 29, 2019, which claims priority under 35 U.S.C. § 119(a) to Japanese Patent Application No. 2018-067198, filed on Mar. 30, 2018. Each of the above applications is hereby expressly incorporated by reference, in its entirety, into the present application.

BACKGROUND OF THE INVENTION

1. Field of the Invention

The present invention relates to an optical element that refracts transmitted light and a light guide element including the optical element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that is actually being seen by a user.

In AR glasses, light (projection light) projected from a display is diffracted (refracted) using a diffraction element to be incident into one end portion of a light guide plate. As a result, the light is incident into the light guide plate at an angle such that the light propagates in the light guide plate. The light propagated in the light guide plate is also diffracted by the diffraction element in the other end portion of the light guide plate and is emitted from the light guide plate to an observation position by the user.

As the light guide plate used in the AR glasses, for example, a light guide plate (waveguide) described in US2016/0231568A is known.

This light guide plate includes a front surface and a rear surface from which light is reflected and guided, a first portion that is provided on the front surface or the rear surface, and a second portion that is provided on the front surface or the rear surface. The first portion has a structure which causes light to change phase upon reflection from the first portion by a first amount. In addition, the second portion on the same surface has a different structure which causes light to change phase upon reflection from the second portion by a second amount different from the first amount, the structure different from the first portion. Further, in the light guide plate, the first portion is offset from the second portion by a distance which substantially matches the difference between the second amount and the first amount.

SUMMARY OF THE INVENTION

The element that changes a liquid crystal alignment pattern in a plane to diffract light as described in JP2010-525394A is expected to be applied as an optical member such as AR glasses. However, there is a problem in that the intensity of transmitted light of light in a wide wavelength range or having a plurality of wavelengths is weak. JP2010-525394A discloses a method of using a complex layer configuration including multiple layers formed of liquid crystal.

An object of the present invention is to solve the above-described problem of the related art and to provide an optical element having a simple configuration in which an intensity of light that is refracted and transmitted or is reflected in a predetermined direction is strong in a wide wavelength range and, for example, in a case where light having different wavelengths incident from the same direction is refracted and transmitted or is reflected in a predetermined direction, the brightness of transmitted light or reflected light is high at any wavelength.

In addition, another object of the present invention is to provide a light guide element including the optical element.

In order to achieve the object, an optical element according to an aspect of the present invention has the following configurations.

(1) An optical element comprising:
an optically-anisotropic layer that is formed using a composition including a liquid crystal compound and an infrared absorbing colorant,
in which the optically-anisotropic layer has a liquid crystal alignment pattern in which a direction of an optical axis derived from the liquid crystal compound changes while continuously rotating in at least one in-plane direction, and
an absorption of the infrared absorbing colorant in a wavelength range of 700 to 2000 nm in a minor axis direction is higher than an absorption of the infrared absorbing colorant in a wavelength range of 700 to 2000 nm in a major axis direction.

(2) The optical element according to (1),
in which an integrated value of absorbance of the infrared absorbing colorant in a wavelength range of 700 to 2000 nm is higher than an integrated value of absorbance of the infrared absorbing colorant in a wavelength range of 400 to 700 nm.

(3) The optical element according to (1) or (2),
in which the infrared absorbing colorant is a compound represented by Formula (1) described below.

(4) The optical element according to any one of (1) to (3),
in which the optically-anisotropic layer has a region where the optical axis is twisted in a thickness direction of the optically-anisotropic layer and rotates.

(5) The optical element according to any one of (1) to (4),
in which the liquid crystal compound is cholesterically aligned in a thickness direction.

(6) The optical element according to any one of (1) to (5),
in which in a case where a length over which the direction of the optical axis derived from the liquid crystal compound rotates by 180° in a plane is set as a single period, the optically-anisotropic layer has regions having different lengths of the single periods in the liquid crystal alignment pattern.

(7) The optical element according to any one of (1) to (6), in which the length of the single period in the liquid crystal alignment pattern gradually decreases in the in-plane direction in which the direction of the optical axis derived from the liquid crystal compound changes while continuously rotating in the liquid crystal alignment pattern.

(8) The optical element according to any one of (1) to (7), in which the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

(9) The optical element according to any one of (1) to (8), comprising
a plurality of optically-anisotropic layers,
in which the optically-anisotropic layers have different directions in which the optical axis is twisted in a thickness direction of the optically-anisotropic layer and rotates.

(10) The optical element according to any one of (1) to (9),
in which the length of the single period in the liquid crystal alignment pattern is 50 μm or less.

(11) A light guide element comprising:
the optical element according to any one of (1) to (10); and
a light guide plate.

In an optical element according to an aspect of the present invention, an intensity of light that is refracted and transmitted or is reflected in a predetermined direction is strong in a wide wavelength range and, for example, in a case where light having different wavelengths incident from the same direction is refracted and transmitted or is reflected in a predetermined direction, light having a high brightness can be emitted at any wavelength.

In addition, in the light guide element according to the present invention including the above-described optical element, with one light guide plate, a plurality of light components having different wavelengths can be guided and emitted with a high brightness.

DESCRIPTION OF THE PREFERRED EMBODIMENTS

Hereinafter, an optical element according to an embodiment of the present invention will be described in detail based on preferable embodiments shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, in visible light, light in a wavelength range of 420 to 490 nm refers to blue light, light in a wavelength range of 495 to 570 nm refers to green light, and light in a wavelength range of 620 to 750 nm refers to red light.

In the present specification, $Re(\lambda)$ represents an in-plane retardation at a wavelength $\lambda$. Unless specified otherwise, the wavelength $\lambda$ refers to 550 nm.

In the present specification, $Re(\lambda)$ is a value measured at the wavelength $\lambda$ using AxoScan (manufactured by Axometrics, Inc.). By inputting an average refractive index $((nx+ny+nz)/3)$ and a thickness (d (μm)) to AxoScan, the following expressions can be calculated.

Slow Axis Direction (°)

$Re(\lambda)=R0(\lambda)$ $R0(\lambda)$ is expressed as a numerical value calculated by AxoScan and represents $Re(\lambda)$.

An optical element according to an embodiment of the present invention comprises:
an optically-anisotropic layer that is formed using a composition including a liquid crystal compound and an infrared absorbing colorant, in which the optically-anisotropic layer has a liquid crystal alignment pattern in which a direction of an optical axis derived from the liquid crystal compound changes while continuously rotating in at least one in-plane direction, and an absorption of the infrared absorbing colorant in a wavelength range of 700 to 2000 nm in a minor axis direction is higher than an absorption of the infrared absorbing colorant in a wavelength range of 700 to 2000 nm in a major axis direction.

Although described in detail below, the optical element according to the embodiment of the present invention has the above-described configuration such that wavelength dependence of an intensity of incident and transmitted light can be reduced.

[Aspect of Optical Element]

Figure 1:
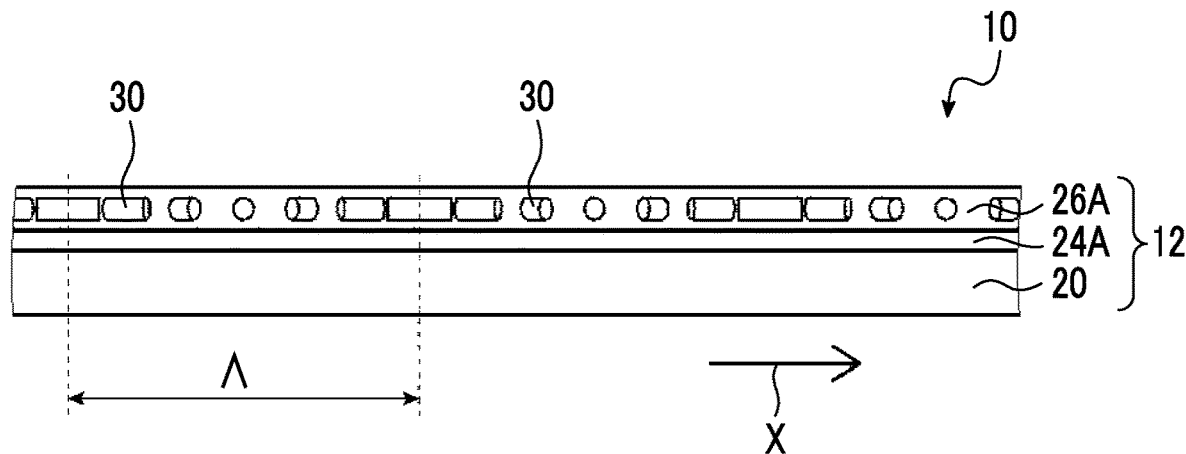
FIG. 1 is a diagram conceptually showing an example of an optical element according to the present invention.

FIG. 1 is a diagram conceptually showing an example of the optical element according to the embodiment of the present invention.

An optical element 10 in the example shown in the drawing includes a first optically-anisotropic member 12.

As described above, in the optical element according to the embodiment of the present invention, a plurality of optically-anisotropic layers that are formed using a composition including a liquid crystal compound and an infrared absorbing colorant and have a predetermined liquid crystal alignment pattern in which an optical axis derived from the liquid crystal compound rotate are arranged in a thickness direction. The first optically-anisotropic member 12 includes a support 20, an alignment film 24A, and a first optically-anisotropic layer 26A.

In addition, the optical element 10 shown in the drawing includes the support 20 for each of the optically-anisotropic members. However, the optical element according to the embodiment of the present invention does not necessarily include the support 20 for each of the optically-anisotropic members.

Alternatively, the support 20 may be peeled off from the above-described configuration such that only the alignment film 24A and the first optically-anisotropic layer 26A configure the optical element according to the embodiment of the present invention. In addition, the alignment film 24A may also be peeled off from the above-described configuration such that only the first optically-anisotropic layer 26A configures the optical element according to the embodiment of the present invention.

That is, the optical element according to the embodiment of the present invention can adopt various layer configurations as long as it comprises:

an optically-anisotropic layer that is formed using a composition including a liquid crystal compound and an infrared absorbing colorant, in which the optically-anisotropic layer has a liquid crystal alignment pattern in which a direction of an optical axis derived from the liquid crystal compound changes while continuously rotating in at least one in-plane direction, and an absorption of the infrared absorbing colorant in a wavelength range of 700 to 2000 nm in a minor axis direction is higher than an absorption of the infrared absorbing colorant in a wavelength range of 700 to 2000 nm in a major axis direction.

<Optically-Anisotropic Member>

In the optical element 10 according to the embodiment of the present invention, the first optically-anisotropic member 12 is provided.

As described above, the first optically-anisotropic member 12 includes the support 20, the alignment film 24A, and the first optically-anisotropic layer 26A.

<<Support>>

In the first optically-anisotropic member 12, the support 20 supports the alignment film 24A and the first optically-anisotropic layer 26A.

In the following description, in a case where it is not necessary to distinguish the alignment film from another alignment film, the alignment films will also be simply referred to as "alignment film". In the following description, in a case where it is not necessary to distinguish the optically-anisotropic layer from another optically-anisotropic layer, the optically-anisotropic layer will also be simply referred to as "optically-anisotropic layer".

As the support 20, various sheet-shaped materials (films or plate-shaped materials) can be used as long as they can support the alignment film and the optically-anisotropic layer.

As the support 20, a transparent support is preferable, and examples thereof include a polyacrylic resin film such as polymethyl methacrylate, a cellulose resin film such as cellulose triacetate, a cycloolefin polymer film (for example, trade name "ARTON", manufactured by JSR Corporation; or trade name "ZEONOR", manufactured by Zeon Corporation), polyethylene terephthalate (PET), polycarbonate, and polyvinyl chloride.

The support 20 is not limited to a flexible film and may be a non-flexible substrate such as a glass substrate.

The thickness of the support 20 is not particularly limited and may be appropriately set depending on the use of the optical element 10, a material for forming the support 20, and the like in a range where the alignment film and the optically-anisotropic layer can be supported.

The thickness of the support 20 is preferably 1 to 1000 µm, more preferably 3 to 250 µm, and still more preferably 5 to 150 µm.

<<Alignment Film>>

In the first optically-anisotropic member 12, the alignment film 24A is formed on the surface of the support 20.

The alignment film 24A is an alignment film for aligning the liquid crystal compound 30 to a predetermined liquid crystal alignment pattern during the formation of the first optically-anisotropic layer 26A of the first optically-anisotropic member 12.

Although described below, in the optical element 10 according to the embodiment of the present invention, the optically-anisotropic layer has a liquid crystal alignment pattern in which a direction of an optical axis 30A (refer to FIG. 3) derived from the liquid crystal compound 30 changes while continuously rotating in one in-plane direction (arrow X direction described below). Accordingly, the alignment film of each of the optically-anisotropic members is formed such that the optically-anisotropic layer can form the liquid crystal alignment pattern.

In the following description, "the direction of the optical axis 30A rotates" will also be simply referred to as "the optical axis 30A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as @-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element 10 according to the embodiment of the present invention, for example, the alignment film can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

As the photo-alignable material used in the photo-alignment film that can be used in the present invention, for example, an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound (in particular, a cinnamate compound, a chalcone compound, or a coumarin compound) described in JP1997-118717A (JP-H9-118717A), JP1998-506420A (JP-H10-506420A), JP2003-505561A, WO2010/150748A, JP2013-177561A, and JP2014-12823A is preferable.

Among these, an azo compound, a photocrosslinking polyimide, a photocrosslinking polyamide, a photocrosslinking ester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 9:
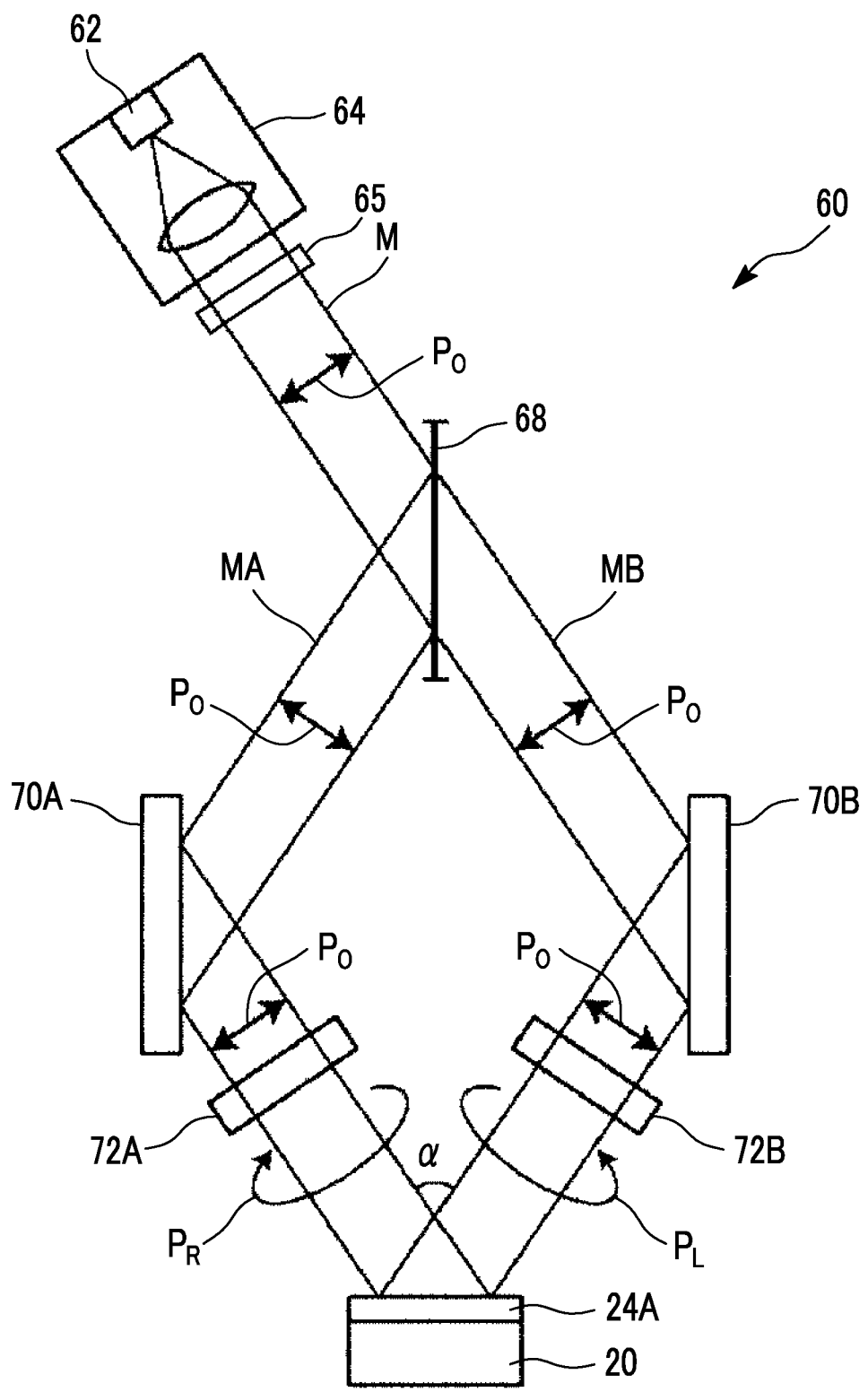
FIG. 9 is a diagram conceptually showing one example of an exposure device that exposes an alignment film of the optical element shown in FIG. 1.

FIG. 9 conceptually shows an example of an exposure device that exposes the alignment film to form an alignment pattern. In the example shown in FIG. 9, for example, the exposure of the alignment film 24A of the first optically-anisotropic member 12 is shown.

An exposure device 60 shown in FIG. 9 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 20 including the alignment film 24A on which the alignment pattern is not yet formed is disposed at an exposed portion, the two beams MA and MB intersect and interfere each other on the alignment film 24A, and the alignment film 24A is irradiated with and exposed to the interference light.

Due to the interference at this time, the polarization state of light with which the alignment film 24A is irradiated periodically changes according to interference fringes. As a result, in the alignment film 24A, an alignment pattern in which the alignment state periodically changes can be obtained.

In the exposure device 60, by changing an intersection angle α between the two beams MA and MB, the period of the alignment pattern can be adjusted. That is, by adjusting the intersection angle α in the exposure device 60, in the crystal alignment pattern in which the optical axis 30A derived from the liquid crystal compound 30 continuously rotates in the in-plane direction, the length (single period Λ) of the single period over which the optical axis 30A rotates by 180° in the in-plane direction in which the optical axis 30A rotates can be adjusted.

By forming the optically-anisotropic layer on the alignment film having the alignment pattern in which the alignment state periodically changes, as described below, the first optically-anisotropic layer 26A having the liquid crystal alignment pattern in which the optical axis 30A derived from the liquid crystal compound 30 continuously rotates in the in-plane direction can be formed.

In addition, by rotating the optical axes of the λ/4 plates 72A and 72B by 90°, respectively, the rotation direction of the optical axis 30A can be reversed.

In the optical element according to the embodiment of the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the first optically-anisotropic layer 26A or the like has the liquid crystal alignment pattern in which the direction of the optical axis 30A derived from the liquid crystal compound 30 changes while continuously rotating in at least one in-plane direction.

<<Optically-Anisotropic Layer>>

In the first optically-anisotropic member 12, the first optically-anisotropic layer 26A is formed on the surface of the alignment film 24A.

In FIG. 1 (and FIGS. 4 and 5 described below), in order to simplify the drawing and to clarify the configuration of the optical element 10, only the liquid crystal compound 30

Figure 2:
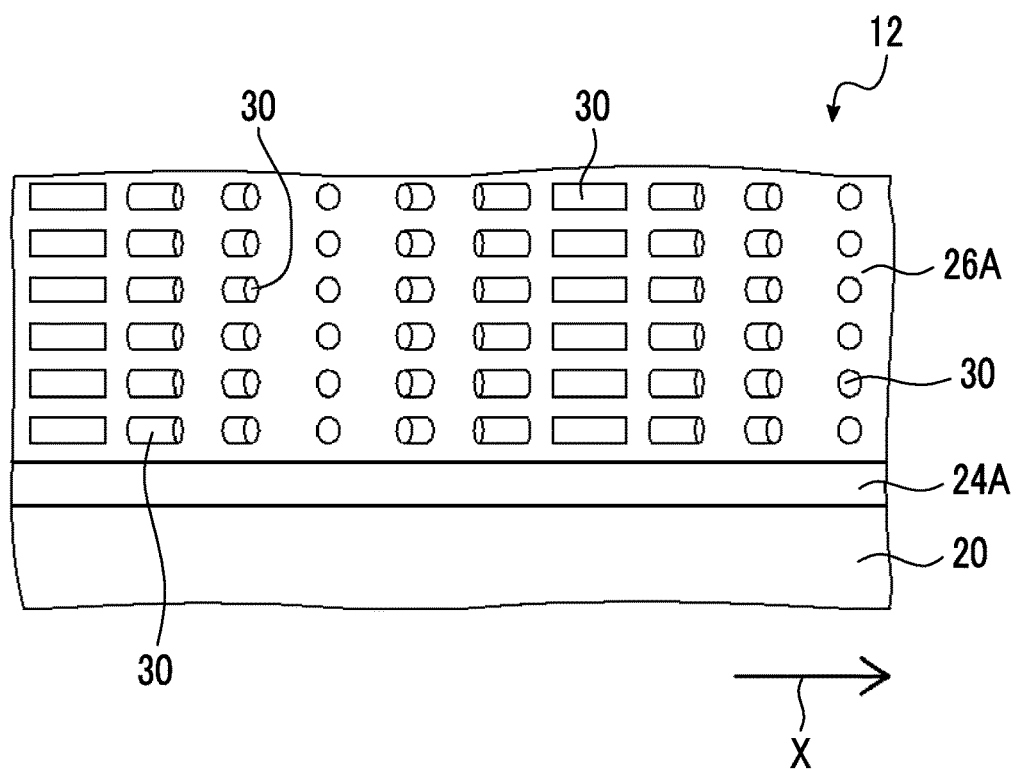
FIG. 2 is a conceptually showing an optically-anisotropic layer of the optical element shown in FIG. 1.

(liquid crystal compound molecules) on the surface of the alignment film in the first optically-anisotropic layer 26A is shown. However, as conceptually shown in FIG. 2 showing the first optically-anisotropic layer 26A, the first optically-anisotropic layer 26A has a structure in which the aligned liquid crystal compounds 30 are laminated as in an optically-anisotropic layer that is formed using a composition including a typical liquid crystal compound.

In addition, the optically-anisotropic layer descried below also includes the infrared absorbing colorant (not shown).

As described above, in the optical element 10 according to the embodiment of the present invention, the optically-anisotropic layer (the first optically-anisotropic layer 26A) is formed using the composition including the liquid crystal compound and the infrared absorbing colorant.

In a case where an in-plane retardation value is set as $\lambda/2$, the optically-anisotropic layer has a function of a general $\lambda/2$ plate, that is, a function of imparting a phase difference of a half wavelength, that is, 180° to two linearly polarized light components that are included in light incident into the optically-anisotropic layer and are perpendicular to each other.

The optically-anisotropic layer has the liquid crystal alignment pattern in which the direction of the optical axis derived from the liquid crystal compound changes while continuously rotating in one direction indicated by arrow X in a plane of the optically-anisotropic layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction.

In the following description, "one direction indicated by arrow X" will also be simply referred to as "arrow X direction". In addition, in the following description, the optical axis 30A derived from the liquid crystal compound 30 will also be referred to as "the optical axis 30A of the liquid crystal compound 30" or "the optical axis 30A".

In each of the optically-anisotropic layer, the liquid crystal compound 30 is two-dimensionally aligned in a plane parallel to the arrow X direction and in a Y direction perpendicular to the arrow X direction. In FIGS. 1 and 2 and FIGS. 4 and 5 described below, the Y direction is a direction perpendicular to the paper plane.

Figure 3:
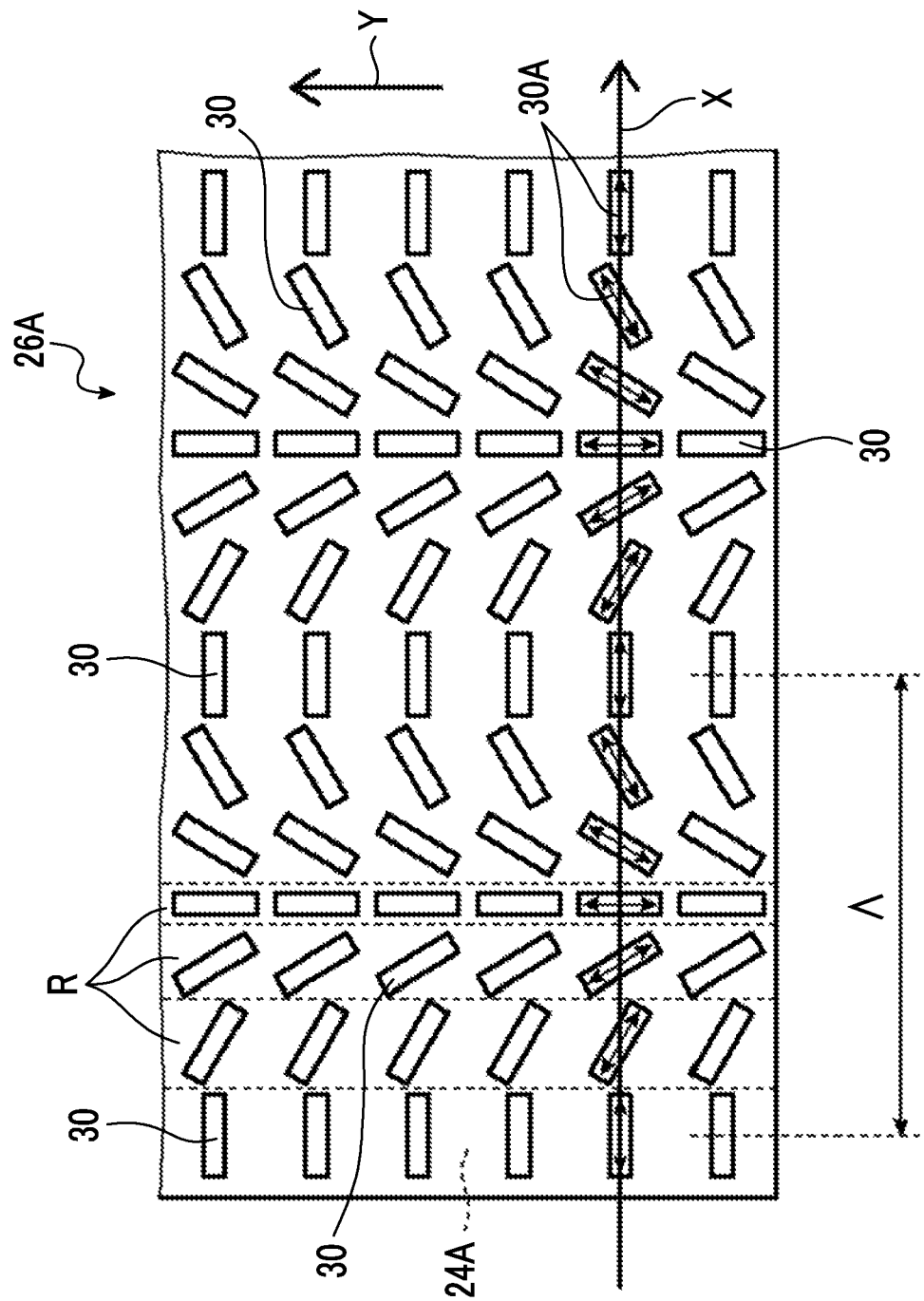
FIG. 3 is a plan view showing the optically-anisotropic layer of the optical element shown in FIG. 1.

FIG. 3 conceptually shows a plan view of the first optically-anisotropic layer 26A.

The plan view is a view in a case where the optical element 10 is seen from the top in FIG. 1, that is, a view in a case where the optical element 10 is seen from a thickness direction (laminating direction of the respective layers (films)). In other words, the plan view is a view in a case where the first optically-anisotropic layer 26A is seen from a direction perpendicular to a main surface.

In addition, in FIG. 3, in order to clarify the configuration of the optical element 10 according to the embodiment of the present invention, only the liquid crystal compound 30 on the surface of the alignment film 24A is shown as in FIG. 1. However, in the thickness direction, as shown in FIG. 2, the first optically-anisotropic layer 26A has the structure in which the liquid crystal compound 30 is laminated on the surface of the alignment film 24A as described above.

In FIG. 3, the first optically-anisotropic layer 26A will be described as a representative example. However, basically, the optically-anisotropic layer described below also has the same configuration and the same effects as those of the first optically-anisotropic layer 26A, except that the lengths (single periods $\Lambda$) of the single periods of the liquid crystal alignment patterns described below are different from each other.

The first optically-anisotropic layer 26A has the liquid crystal alignment pattern in which the direction of the optical axis 30A derived from the liquid crystal compound 30 changes while continuously rotating in the arrow X direction in a plane of the first optically-anisotropic layer 26A.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from $\theta$ to $\theta+180°$ or $\theta-180°$ in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, regarding the liquid crystal compound 30 forming the first optically-anisotropic layer 26A, the liquid crystal compounds 30 having the same direction of the optical axes 30A are arranged at regular intervals in the Y direction perpendicular to the arrow X direction, that is, the Y direction perpendicular to the in-plane direction in which the optical axis 30A continuously rotates.

In other words, regarding the liquid crystal compound 30 forming the first optically-anisotropic layer 26A, in the liquid crystal compounds 30 arranged in the Y direction, angles between the directions of the optical axes 30A and the arrow X direction are the same.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the direction of the optical axis 30A changes while continuously rotating in a plane is the length $\Lambda$ of the single period in the liquid crystal alignment pattern. In other words, the length of the single period in the liquid crystal alignment pattern is defined as the distance between $\theta$ and $\theta+180°$ that is a range of the angle between the optical axis 30A of the liquid crystal compound 30 and the arrow X direction.

That is, a distance between centers of two liquid crystal compounds 30 in the arrow X direction is the length $\Lambda$ of the single period, the two liquid crystal compounds having the same angle in the arrow X direction. Specifically, as shown in FIG. 3, a distance of centers in the arrow X direction of two liquid crystal compounds 30 in which the arrow X direction and the direction of the optical axis 30A match each other is the length $\Lambda$ of the single period. In the following description, the length $\Lambda$ of the single period will also be referred to as "single period $\Lambda$".

In the optical element 10 according to the embodiment of the present invention, in the liquid crystal alignment pattern of the optically-anisotropic layer, the single period $\Lambda$ is repeated in the arrow X direction, that is, in the in-plane direction in which the direction of the optical axis 30A changes while continuously rotating.

As described above, in the liquid crystal compounds 30 arranged in the Y direction in the optically-anisotropic layer, the angles between the optical axes 30A and the arrow X direction (the in-plane direction in which the direction of the optical axis of the liquid crystal compound 30 rotates) are the same. Regions where the liquid crystal compounds 30 in which the angles between the optical axes 30A and the arrow X direction are the same are arranged in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In a case where circularly polarized light is incident into the above-described optically-anisotropic layer (the first optically-anisotropic layer 26A), the light is refracted such that the direction of the circularly polarized light is converted.

Figure 4:
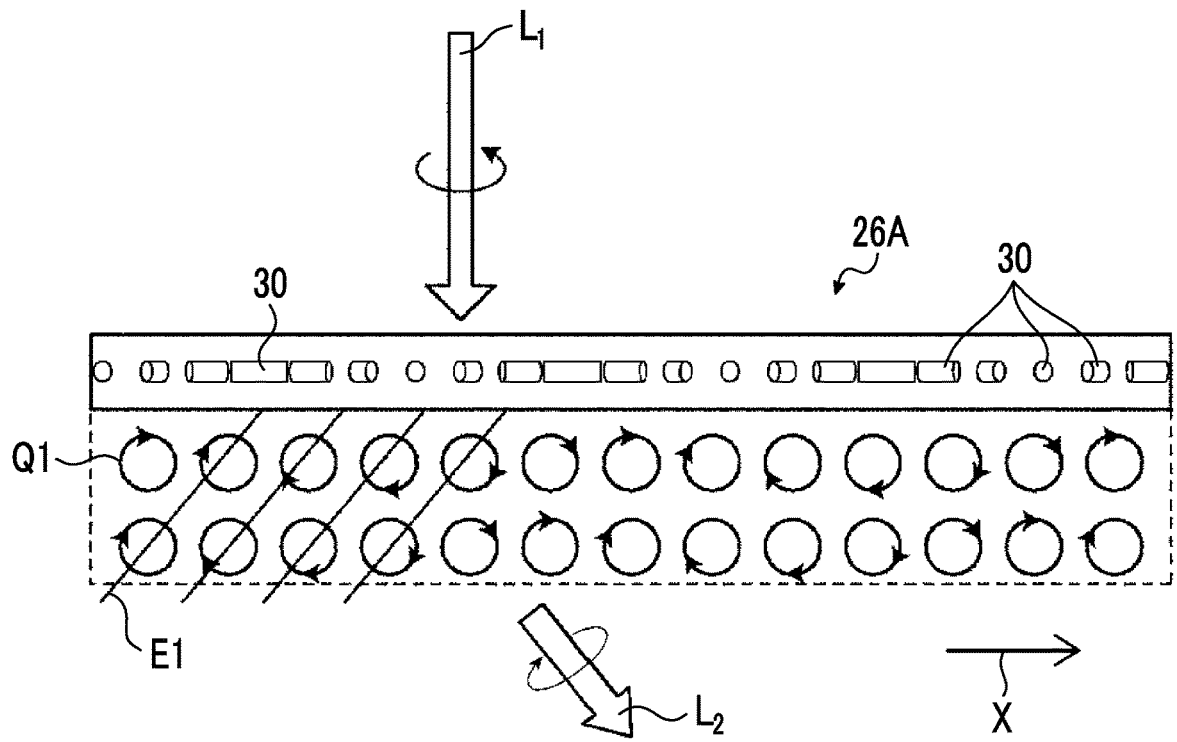
FIG. 4 is a conceptual diagram showing the action of the optically-anisotropic layer of the optical element shown in FIG. 1.

This action is conceptually shown in FIG. 4 using the first optically-anisotropic layer 26A. In the first optically-anisotropic layer 26A, the value of the product of the difference in refractive index of the liquid crystal compound and the thickness of the optically-anisotropic layer is λ/2.

As shown in FIG. 4, in a case where the value of the product of the difference in refractive index of the liquid crystal compound and the thickness of the optically-anisotropic layer in the first optically-anisotropic layer 26A is λ/2 and incidence light $L_1$ as left circularly polarized light is incident into the first optically-anisotropic layer 26A, the incidence light $L_1$ transmits through the first optically-anisotropic layer 26A to be imparted with a phase difference of 180° such that the transmitted light $L_2$ is converted into right circularly polarized light.

In addition, in a case where the incidence light $L_1$ transmits through the first optically-anisotropic layer 26A, an absolute phase thereof changes depending on the direction of the optical axis 30A of each of the liquid crystal compounds 30. At this time, the direction of the optical axis 30A changes while rotating in the arrow X direction. Therefore, the amount of change in the absolute phase of the incidence light $L_1$ varies depending on the direction of the optical axis 30A. Further, the liquid crystal alignment pattern that is formed in the first optically-anisotropic layer 26A is a pattern that is periodic in the arrow X direction. Therefore, as shown in FIG. 4, the incidence light $L_1$ transmitted through the first optically-anisotropic layer 26A is imparted with an absolute phase Q1 that is periodic in the arrow X direction corresponding to the direction of each of the optical axes 30A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light $P_L$ is converted into the transmitted light $L_2$ of right circularly polarized light that is tilted by a predetermined angle in the arrow X direction with respect to an incidence direction.

Figure 5:
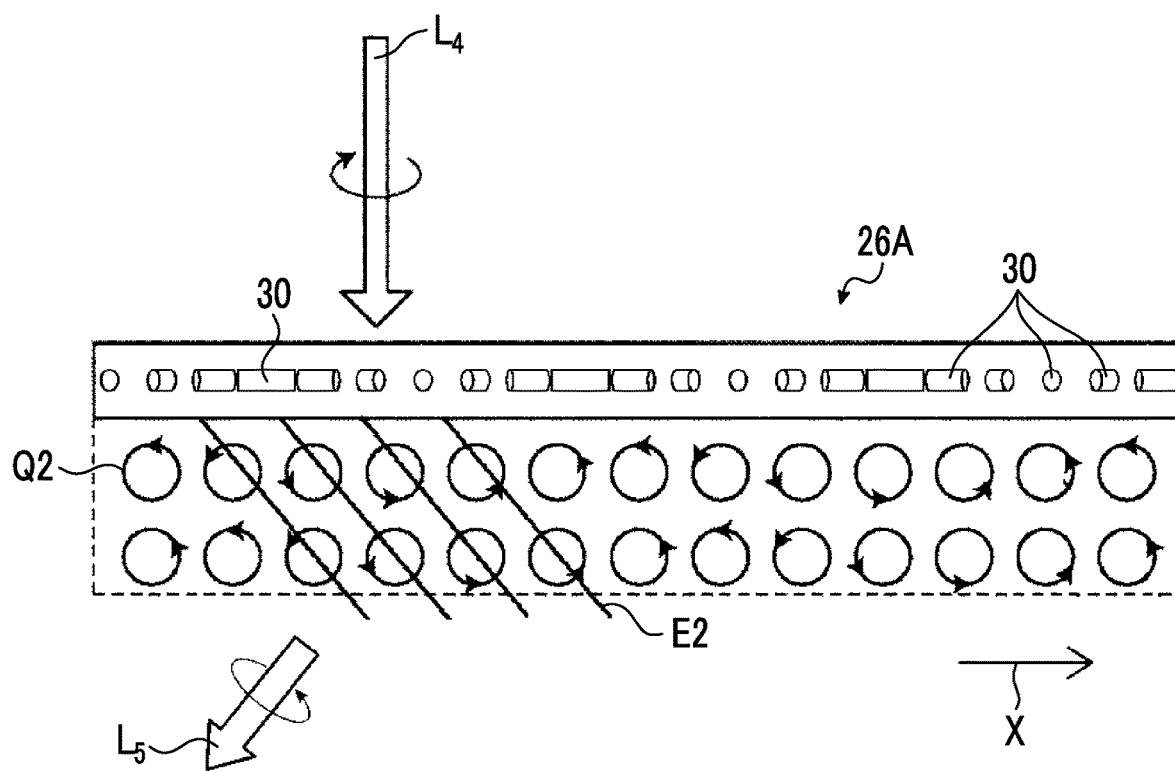
FIG. 5 is a conceptual diagram showing the action of the optically-anisotropic layer of the optical element shown in FIG. 1.

On the other hand, as conceptually shown in FIG. 5, in a case where the value of the product of the difference in refractive index of the liquid crystal compound and the thickness of the optically-anisotropic layer in the first optically-anisotropic layer 26A is λ/2 and incidence light $L_4$ as right circularly polarized light is incident into the first optically-anisotropic layer 26A, the incidence light La transmits through the first optically-anisotropic layer 26A to be imparted with a phase difference of 180° and is converted into transmitted light Ls of left circularly polarized light.

In addition, in a case where the incidence light La transmits through the first optically-anisotropic layer 26A, an absolute phase thereof changes depending on the direction of the optical axis 30A of each of the liquid crystal compounds 30. At this time, the direction of the optical axis 30A changes while rotating in the arrow X direction. Therefore, the amount of change in the absolute phase of the incidence light $L_4$ varies depending on the direction of the optical axis 30A. Further, the liquid crystal alignment pattern that is formed in the first optically-anisotropic layer 26A is a pattern that is periodic in the arrow X direction. Therefore, as shown in FIG. 5, the incidence light LA transmitted through the first optically-anisotropic layer 26A is imparted with an absolute phase Q2 that is periodic in the arrow X direction corresponding to the direction of each of the optical axes 30A.

Here, the incidence light La is right circularly polarized light. Therefore, the absolute phase Q2 that is periodic in the arrow X direction corresponding to the direction of the optical axis 30A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light La is converted into the transmitted light $L_5$ of left circularly polarized light that is tilted by a predetermined angle in a direction opposite to the arrow X direction with respect to an incidence direction.

In the first optically-anisotropic layer 26A, it is preferable that the in-plane retardation value of the plurality of regions R is a half wavelength. It is preferable that an in-plane retardation $Re(550) = \Delta n_{550} \times d$ of the plurality of regions R of the first optically-anisotropic layer 26A with respect to the incidence light having a wavelength of 550 nm is in a range defined by the following Expression (X-1). Here, $\Delta n_{550}$ represents a difference in refractive index generated by refractive index anisotropy of the region R in a case where the wavelength of incidence light is 550 nm, and d represents the thickness of the first optically-anisotropic layer 26A.

$$200 \text{ nm} \leq \Delta n_{550} \times d \leq 350 \text{ nm} \quad \quad \text{(X-1)}.$$

That is, in a case where the in-plane retardation $Re(550) = \Delta n_{550} \times d$ of the plurality of regions R of the first optically-anisotropic layer 26A satisfies Expression (X-1), a sufficient amount of a circularly polarized light component in light incident into the first optically-anisotropic layer 26A can be converted into circularly polarized light that travels in a direction tilted in a forward direction or reverse direction with respect to the arrow X direction. It is more preferable that the in-plane retardation Re(550)=$\Delta n_{550} \times d$ satisfies 225 nm≤$\Delta n_{550} \times d$≤340 nm, and it is still more preferable that the in-plane retardation Re(550)=$\Delta n_{550} \times d$ satisfies 250 nm≤$\Delta n_{550} \times d$≤330 nm.

Expression (X-1) is a range with respect to incidence light having a wavelength of 550 nm. However, an in-plane retardation Re($\lambda$)=$\Delta n_\lambda \times d$ of the plurality of regions R of the optically-anisotropic layer with respect to incidence light having a wavelength of $\lambda$ nm is preferably in a range defined by the following Expression (X-2) and can be appropriately set.

$$0.7 \times (\lambda/2) \text{ nm} \leq \Delta n_\lambda \times d \leq 1.3 \times (\lambda/2) \text{ nm} \quad (X-2)$$

In addition, the value of the in-plane retardation of the plurality of regions R of the first optically-anisotropic layer 26A in a range outside the range of Expression (X-1) can also be used. Specifically, by satisfying $\Delta n_{550} \times d$<200 nm or 350 nm<$\Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

In addition, it is preferable that the optically-anisotropic layer has a wide range for the wavelength of incidence light.

In the optically-anisotropic layer according to the embodiment of the present invention, an absorption of the infrared absorbing colorant in a wavelength range of 700 to 2000 nm in a minor axis direction is higher than an absorption of the infrared absorbing colorant in a wavelength range of 700 to 2000 nm in a major axis direction. The effects obtained depending on the absorption properties will be described below in detail.

Figure 6:
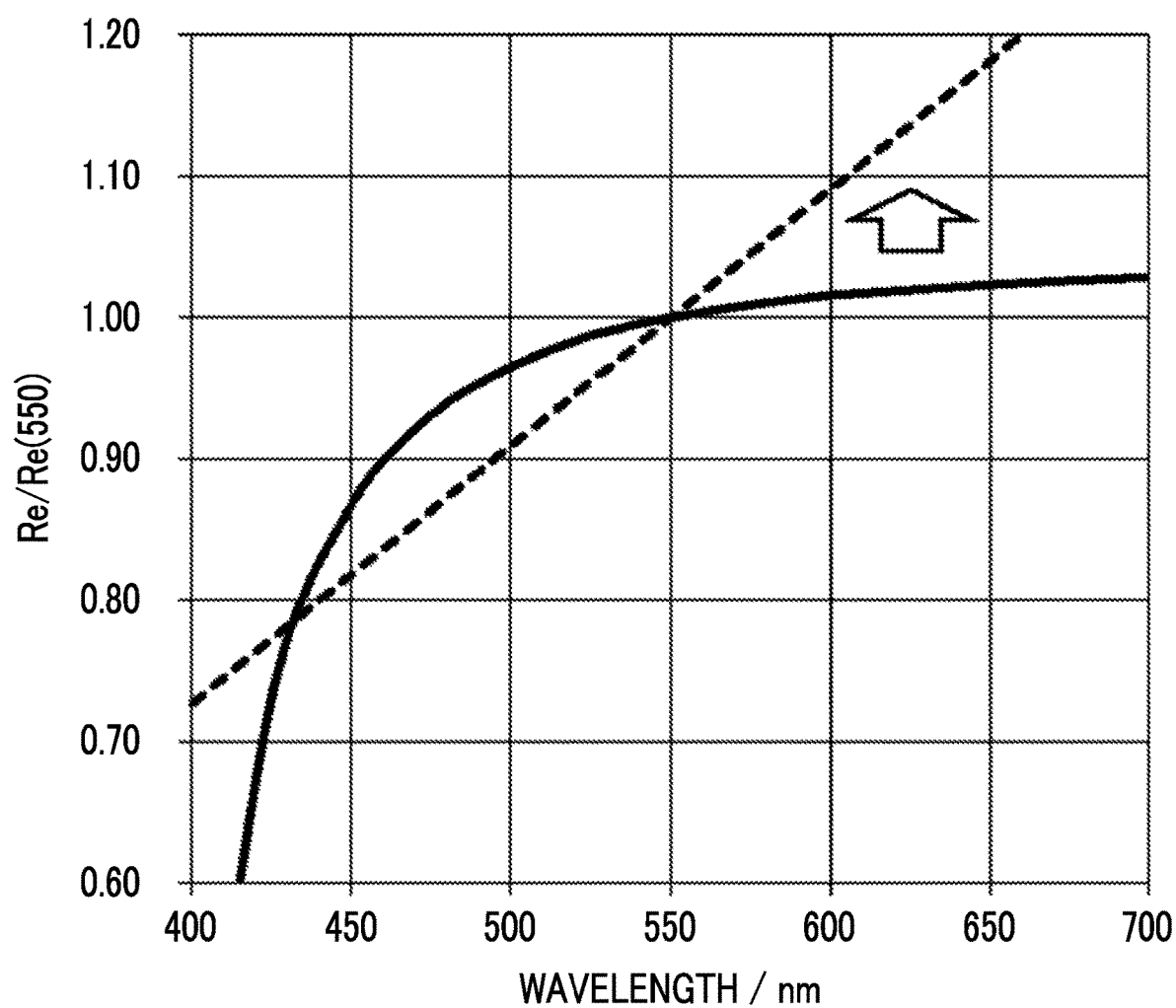
FIG. 6 is a diagram showing a comparison between a wavelength dispersion of an optically-anisotropic layer of the related art showing reverse wavelength dispersion properties and an ideal wavelength dispersion of a phase difference.

First, FIG. 6 shows wavelength dispersion properties of phase differences (Re) at the respective wavelengths in a visible range normalized with respect to 1 that is a phase difference (Re(550 nm)) at a measurement wavelength of 550 nm. For example, since the phase difference is proportional to the measurement wavelength as indicated by a dotted line in FIG. 6, the above-described theoretical $\lambda/2$ plate shows "negative dispersion" properties in which the phase difference increases as the measurement wavelength increases. On the other hand, as indicated by a solid line in FIG. 6, an optically-anisotropic layer of the related art showing reverse wavelength dispersion properties overlaps an ideal curve indicated by a dotted line at some positions in a short wavelength range but tends to deviate from the ideal curve in a long wavelength range.

In the optically-anisotropic layer according to the embodiment of the present invention, the infrared absorbing colorant has absorption properties in a wavelength of 700 to 2000 nm. As a result, as indicated by a white arrow, optical properties in a long wavelength range can be approximated to the ideal curve.

Figure 7:
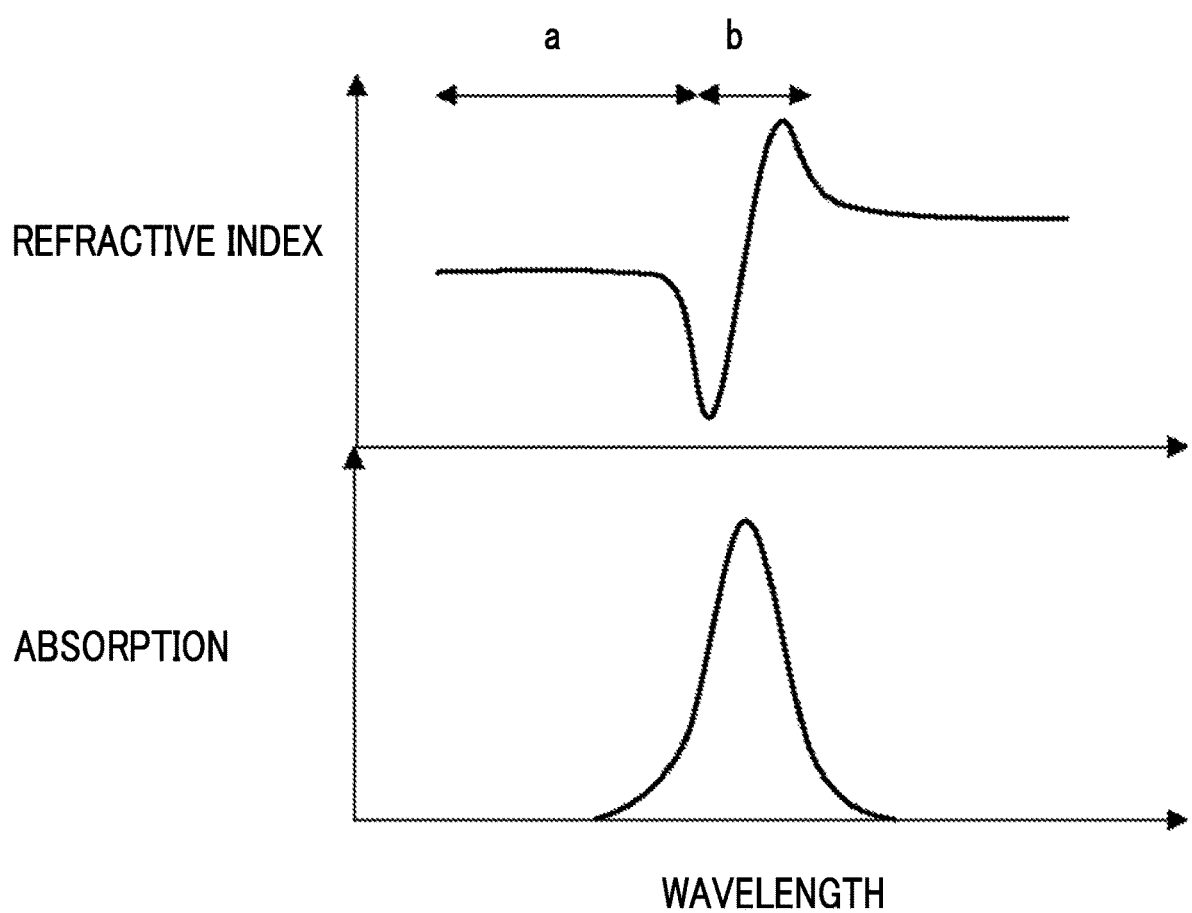
FIG. 7 is a diagram showing wavelength dispersion properties of a refractive index and an absorption coefficient of an organic molecule.

Regarding the reason why the above-described properties can be obtained, refractive index wavelength dispersion properties of a general organic molecule will be described with reference to FIG. 7. In FIG. 7, the upper side shows the behavior of a refractive index with respect to a wavelength, and the lower side shows the behavior (absorption spectrum) of absorption properties with respect to a wavelength.

A refractive index n of the organic molecule in a range (range a in FIG. 7) away from an intrinsic absorption wavelength monotonously decreases as the wavelength increases. This dispersion is also called "normal dispersion". On the other hand, the refractive index n in a wavelength range (wavelength b in FIG. 7) including an intrinsic absorption rapidly increases as the wavelength increases. This dispersion is also called "anomalous dispersion".

That is, as shown in FIG. 7, an increase and decrease in refractive index immediately before a wavelength range having an absorption is observed.

In the optically-anisotropic layer according to the embodiment of the present invention, the infrared absorbing colorant is also aligned along with the alignment of the liquid crystal compound. At this time, the infrared absorbing colorant is aligned such that the major axis of the infrared absorbing colorant is parallel to the optical axis of the liquid crystal compound.

Therefore, in each of the above-described regions R of the optically-anisotropic layer, the infrared absorbing colorant is disposed such that the major axis of the infrared absorbing colorant is parallel to the optical axis of the liquid crystal compound. In other words, the infrared absorbing colorant is disposed such that the major axis of the infrared absorbing colorant is aligned in a direction of a slow axis in a plane of the region R. The above-described slow axis is an axis derived from the optical axis of the liquid crystal compound and corresponds to a direction in which the refractive index of the liquid crystal compound is the highest.

Therefore, as described above, the optically-anisotropic layer has not only the liquid crystal alignment pattern in which the direction of the optical axis derived from the liquid crystal compound changes while continuously rotating along the in-plane direction (the arrow X direction in FIG. 3) but also an alignment pattern in which the major axis direction of the infrared absorbing colorant changes while continuously rotating in the same direction (the arrow X direction in FIG. 3) as the in-plane direction.

As described above, an absorption of the infrared absorbing colorant in a wavelength range of 700 to 2000 nm in a minor axis direction is higher than an absorption of the infrared absorbing colorant in a wavelength range of 700 to 2000 nm in a major axis direction. Therefore, due to the influence of the absorption properties of the infrared absorbing colorant, in each of the regions R of the optically-anisotropic layer, an absorption in a wavelength range of 700 to 2000 nm in a fast axis direction (direction perpendicular to the direction of the slow axis) is higher than an absorption in a wavelength range of 700 to 2000 nm in the slow axis direction. Hereinafter, the above-described absorption properties will also be referred to as "absorption properties X". Although described in detail below, the above-described absorption properties X can be achieved by disposing an axis direction of the infrared absorbing colorant having a high absorbance to be parallel to the fast axis direction in the optically-anisotropic layer.

In a region R of the optically-anisotropic layer having the absorption properties X, an ordinary light refractive index is lower than that in a region R of the optically-anisotropic layer not having the absorption properties X.

Figure 8:
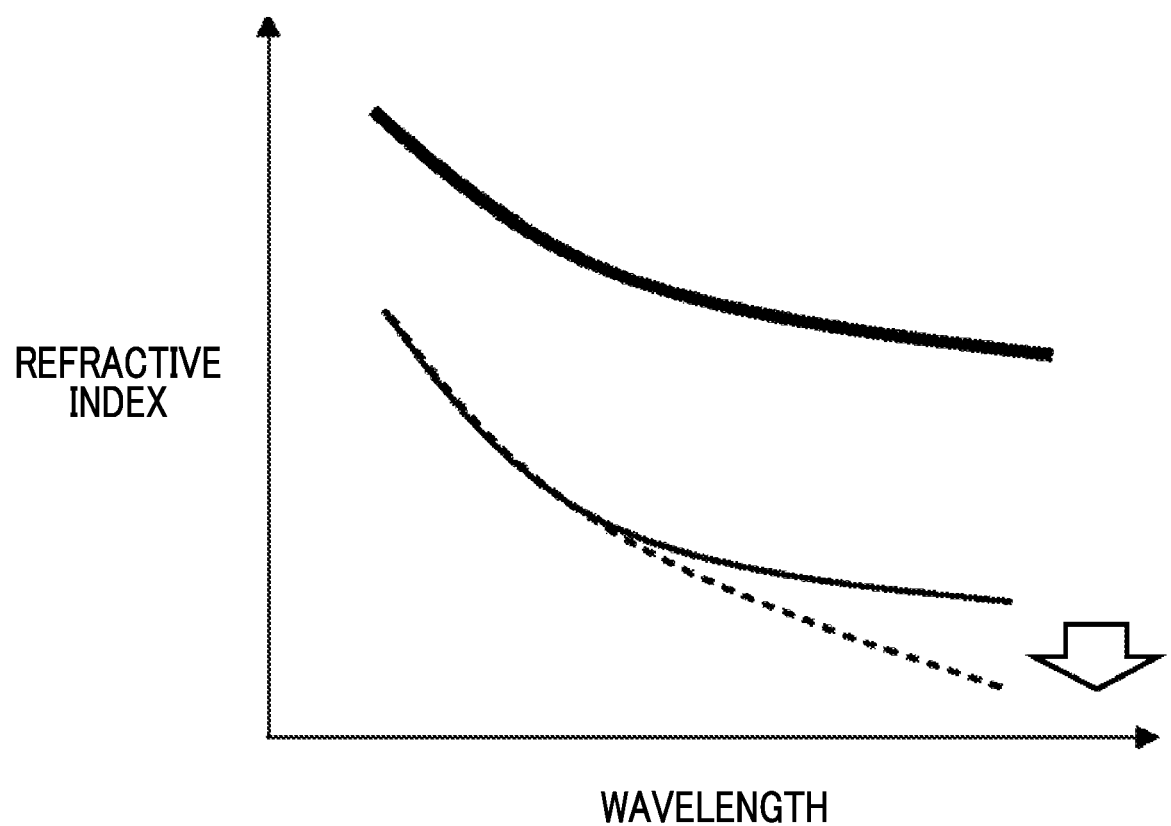
FIG. 8 is a diagram showing a comparison between a wavelength dispersion of an extraordinary light refractive index ne and a wavelength dispersion of an ordinary light refractive index no depending on whether or not predetermined absorption properties are present.

Specifically, FIG. 8 is a diagram showing a comparison between a wavelength dispersion of an extraordinary light refractive index ne and a wavelength dispersion of an ordinary light refractive index no depending on whether or not the absorption properties X are present. In FIG. 8, a thick line indicates a curve of the extraordinary light refractive index ne in a case where the absorption properties X are not present, and a solid line indicates a curve of the ordinary light refractive index no in a case where the absorption properties X are not present. On the other hand, in the region R of the optically-anisotropic layer having the absorption properties X, due to the absorption in a wavelength range of 700 to 2000 nm shown in FIG. 7, the value of the ordinary light refractive index no further decreases in a long wavelength range of a visible range as indicated by a broken line. As a result, in the long wavelength range of the visible range, a birefringence (difference in refractive index) Δn that is a difference between the extraordinary light refractive index ne and the ordinary light refractive index no further increases, and the behavior of the arrow shown in FIG. 6 is achieved. In a case where the behavior shown in FIG. 6 is achieved, dispersion properties of the region R of the optically-anisotropic layer are further approximated to the ideal curve. As a result, in a case where light having different wavelengths incident from the same direction is refracted and transmitted, a state where the brightness of the transmitted light at any wavelength is high can be obtained.

Hereinafter, a configuration of the optically-anisotropic layer will be described in detail.

It is preferable that an in-plane retardation $Re(450)=\Delta n_{450} \times d$ of the region R of the first optically-anisotropic layer 26A at a wavelength of 450 nm and an in-plane retardation $Re(550)=\Delta n_{550} \times d$ of the region R of the first optically-anisotropic layer 26A at a wavelength of 550 nm satisfy the following Formula (A). In this case, $\Delta n_{450} \times d$ is a difference in refractive index caused by the refractivity anisotropy of the region R at a wavelength of 450 nm.

$$(\Delta n_{450} \times d)/(\Delta n_{550} \times d) < 1.0 \quad (A)$$

Expression (A) represents that the region R in the first optically-anisotropic layer 26A has reverse dispersion properties. That is, by satisfying Expression (A), the first optically-anisotropic layer 26A can correspond to incidence light having a wide range of wavelength.

In particular, $(\Delta n_{450} \times d)/(\Delta n_{550} \times d)$ is preferably 0.97 or lower, more preferably 0.92 or lower, and still more preferably 0.87 or lower. The lower limit is not particularly limited and is 0.70 or higher in many cases.

$(\Delta n_{650} \times d)/(\Delta n_{550} \times d)$ of the optically-anisotropic layer is not particularly limited and is preferably 1.05 or higher and more preferably 1.10 or higher. The upper limit is not particularly limited and is preferably 1.25 or lower and more preferably 1.20 or lower.

$Re(650)=\Delta n_{650} \times d$ represents the in-plane retardation of the region R of the optically-anisotropic layer at a wavelength of 650 nm.

In addition, it is also preferable that the optically-anisotropic layer can be made to have a substantially wide range for the wavelength of incidence light by imparting a twist component to the composition or by laminating different phase difference layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

Here, by changing the single period Λ of the liquid crystal alignment pattern formed in the first optically-anisotropic layer 26A, refraction angles of the transmitted light components $L_2$ and $L_5$ can be adjusted. Specifically, as the single period Λ of the liquid crystal alignment pattern decreases, light components transmitted through the liquid crystal compounds 30 adjacent to each other more strongly interfere with each other. Therefore, the transmitted light components $L_2$ and $L_5$ can be more largely refracted. Further, by reversing the rotation direction of the optical axis 30A of the liquid crystal compound 30 that rotates in the arrow X direction, the refraction direction of transmitted light can be reversed.

The optically-anisotropic layer is formed of a cured layer of a composition including a liquid crystal compound (a rod-shaped liquid crystal compound or a disk-shaped liquid crystal compound) and an infrared absorbing colorant, and has a liquid crystal alignment pattern in which an optical axis of the liquid crystal compound (an optical axis of the rod-shaped liquid crystal compound or an optical axis of the disk-shaped liquid crystal compound) is aligned as described above.

By forming an alignment film on the support 20, applying the composition to the alignment film, and curing the applied composition, the optically-anisotropic layer consisting of the cured layer of the composition can be obtained. Although the optically-anisotropic layer functions as a so-called λ/2 plate, the present invention also includes an aspect where a laminate including the support 20 and the alignment film that are integrated functions as a so-called λ/2 plate.

In addition, the composition for forming the optically-anisotropic layer includes a liquid crystal compound (a rod-shaped liquid crystal compound or a disk-shaped liquid crystal compound) and an infrared absorbing colorant and may further include other components such as a leveling agent, an alignment controller, a polymerization initiator, or an alignment assistant.

In the optically-anisotropic layer, an absorption (hereinafter, also referred to as "absorption F") of the region R of the optically-anisotropic layer in a wavelength range of 700 to 2000 nm in a fast axis direction is higher than an absorption (hereinafter, also referred to as "absorption S") of the region R of the optically-anisotropic layer in a wavelength range of 700 to 2000 nm in a slow axis direction.

"The absorption F being higher than the absorption S" represents that a maximum absorbance in a wavelength range of 700 to 2000 nm in an absorption spectrum obtained in a case where the optically-anisotropic layer is irradiated with polarized light parallel to the fast axis of the region R of the optically-anisotropic layer is higher than a maximum absorbance in a wavelength range of 700 to 2000 nm in an absorption spectrum obtained in a case where the optically-anisotropic layer is irradiated with polarized light parallel to the slow axis of the region R of the optically-anisotropic layer.

The above-described measurement can be performed using a spectrophotometer (MPC-3100 (manufactured by Shimadzu Corporation)) including an infrared polarizer.

The above-described absorption anisotropy can be realized using the infrared absorbing colorant as described below. In particular, in a case where a dichroic infrared absorbing colorant is used, the absorption F is higher than the absorption S by disposing an axis direction of the colorant having a higher absorbance to be parallel to the fast axis direction of the region R of the optically-anisotropic layer.

An alignment order parameter $S_0$ of the region R of the optically-anisotropic layer at a maximum absorption wavelength of the infrared absorbing colorant in a wavelength range of 700 to 2000 nm is not particularly limited and preferably satisfies a relationship of Expression (B) from the viewpoint of further improving the effects of the present invention.

$$-0.50 \leq S_0 < -0.15 \quad \text{Expression (B)}$$

It is more preferable that the alignment order parameter $S_O$ is −0.40 to −0.20.

In the present specification, the alignment order parameter $S_O(\lambda)$ of the region R of the optically-anisotropic layer at the wavelength $\lambda$ nm is a value represented by Expression (C).

$$S0(\lambda)=(Ap-Av)/(Ap+2Av) \qquad \text{Expression (C)}$$

In Expression (C), Ap represents an absorbance with respect to light polarized in a direction parallel to the slow axis direction of the region R of the optically-anisotropic layer. Av represents an absorbance with respect to light polarized in a direction perpendicular to the slow axis direction of the region R of the optically-anisotropic layer.

The alignment order parameter $S_O(\lambda)$ of the region R of the optically-anisotropic layer can be obtained by the measurement of polarization absorption of the optically-anisotropic layer. The above-described measurement can be performed using a spectrophotometer (MPC-3100 (manufactured by Shimadzu Corporation)) including an infrared polarizer. $\lambda$ represents a maximum absorption wavelength of an absorption spectrum in a wavelength range of 700 to 2000 nm obtained by absorption measurement of the region R of the optically-anisotropic layer.

The optically-anisotropic layer is formed of the composition including the liquid crystal compound and the infrared absorbing colorant. Hereinafter, materials to be used will be described in detail, and then a method of manufacturing the optically-anisotropic layer will be described in detail.

Liquid Crystal Compound

The kind of the liquid crystal compound is not particularly limited and can be classified into a rod-shaped type (a rod-shaped liquid crystal compound) and a disk-shaped type (a disk-shaped liquid crystal compound or a discotic liquid crystal compound) in terms of the shape. Further, the liquid crystal compound can also be classified into a low molecular weight type and a high molecular weight type. In general, the high molecular weight type refers to a compound having a polymerization degree of 100 or higher (Polymer Physics-Phase Transition Dynamics, Masao Doi, page 2, Iwanami Shoten Publishers, 1992). In addition, two or more rod-shaped liquid crystal compounds, two or more disk-shaped liquid crystal compounds, or a mixture of a rod-shaped liquid crystal compound and a disk-shaped liquid crystal compound may be used.

The position of the maximum absorption wavelength of the liquid crystal compound is not particularly limited and is preferably positioned in an ultraviolet range from the viewpoint of further improving the effects of the present invention.

Since a change in temperature and a change in humidity of the optical properties can be reduced, a liquid crystal compound having a polymerizable group (a rod-shaped liquid crystal compound or a disk-shaped liquid crystal compound) is preferable as the liquid crystal compound. The liquid crystal compound may also be a mixture of two or more kinds. In this case, it is preferable that at least one liquid crystal compound has two or more polymerizable groups.

That is, it is preferable that the optically-anisotropic layer is formed by immobilizing a liquid crystal compound having a polymerizable group (a rod-shaped liquid crystal compound or a disk-shaped liquid crystal compound) by polymerization or the like. In this case, it is not necessary that the layer formed of the liquid crystal compound exhibits liquid crystal properties.

The kind of the above-described polymerizable group is not particularly limited, and polymerizable group capable of radical polymerization or cationic polymerization is preferable.

As the radically polymerizable group, a well-known radically polymerizable group can be used, and an acryloyl group or a methacryloyl group is preferable.

As the cationically polymerizable group, a well-known cationically polymerizable group can be used, and specific examples thereof include an alicyclic ether group, a cyclic acetal group, a cyclic lactone group, a cyclic thioether group, a spiro ortho ester group, and a vinyloxy group. In particular, an alicyclic ether group or a vinyloxy group is preferable, and an epoxy group, an oxetanyl group, or a vinyloxy group is more preferable.

In particular, preferable examples of the polymerizable group are as follows.

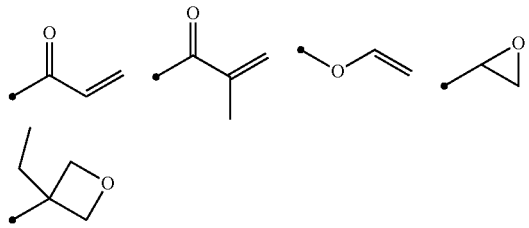

As the liquid crystal compound, a compound represented by Formula (I) is preferable.

$$L^1\text{-}SP^1\text{-}A^1\text{-}D^3\text{-}G^1\text{-}D^1\text{-}Ar\text{-}D^2\text{-}G^2\text{-}D^4\text{-}A^2\text{-}SP^2\text{-}L^2 \qquad \text{Formula (I)}$$

In Formula (I), $D^1$, $D^2$, $D^3$, and $D^4$ each independently represent a single bond, —O—CO—, —C(=S)O—, —CR$^1$—R$^2$—, —CR$^1$R$^2$—CR$^3$R$^4$, —O—CR$^1$R$^2$, —CR$^1$R$^2$—O—CR$^3$R$^4$—, —CO—O—CR$^1$—R$^2$—, —O—CO—CR$^1$—R$^2$—, —CR$^1$R$^2$—O—CO—CR$^3$R$^4$—, —CR$^1$R$^2$—CO—O—CR$^3$R$^4$—, —NR$^1$—CR$^2$R$^3$—, or —CO—NR$^1$—.

$R^1$, $R^2$, $R^3$, and $R^4$ each independently represent a hydrogen atom, a fluorine atom, or an alkyl group having 1 to 4 carbon atoms.

In addition, in Formula (I), $G^1$ and $G^2$ each independently represent a divalent alicyclic hydrocarbon group having 5 to 8 carbon atoms, and one or more —CH$_2$—'s forming the alicyclic hydrocarbon group may be substituted with —O—, —S—, or —NH—. In addition, in Formula (I), $A^1$ and $A^2$ each independently represent a single bond, an aromatic ring having 6 or more carbon atoms, or a cycloalkylene ring having 6 or more carbon atoms.

In addition, in Formula (I), $SP^1$ and $SP^2$ each independently represent a single bond, a linear or branched alkylene group having 1 to 14 carbon atoms, or a divalent linking group in which one or more —CH$_2$—'s forming the linear or branched alkylene group having 1 to 14 carbon atoms are substituted with —O—, —S—, —NH—, —N(Q)—, or —CO—, and Q represents a polymerizable group.

In addition, in Formula (I), $L^1$ and $L^2$ each independently a monovalent organic group (for example, an alkyl group or a polymerizable group).

In a case where Ar represents a group represented by Formula (Ar-1), Formula (Ar-2), Formula (Ar-4), or Formula (Ar-5) described below, at least one of $L^1$ or $L^2$ represents a polymerizable group. In addition, in a case where Ar represents a group represented by Formula (Ar-3)

described below, at least one of $L^1$ and $L^2$ and $L^3$ and $L^4$ in Formula (Ar-3) described below represents a polymerizable group.

As the divalent alicyclic hydrocarbon group having 5 to 8 carbon atoms represented by $G^1$ and $G^2$ in Formula (I), a 5- or 6-membered ring is preferable. In addition, the alicyclic hydrocarbon group may be a saturated alicyclic hydrocarbon group or an unsaturated alicyclic hydrocarbon group and is preferably a saturated alicyclic hydrocarbon group. The details of the divalent alicyclic hydrocarbon group represented by $G^1$ and $G^2$ can be found in, for example, paragraph "0078" of JP2012-021068A, the content of which is incorporated herein by reference.

Examples of the aromatic ring having 6 or more carbon atoms represented by $A^1$ and $A^2$ in Formula (I) include: an aromatic hydrocarbon ring such as a benzene ring, a naphthalene ring, an anthracene ring, or a phenanthroline ring; and an aromatic heterocycle such as a furan ring, a pyrrole ring, a thiophene ring, a pyridine ring, a thiazole ring, or a benzothiazole ring. In particular, a benzene ring (for example, a 1,4-phenyl group) is preferable.

In addition, examples of the cycloalkylene ring having 6 or more carbon atoms represented by $A^1$ and $A^2$ in Formula (I) include a cyclohexane ring and a cyclohexene ring. In particular, a cyclohexane ring (for example, a cyclohexane-1,4-diyl group) is preferable.

As the linear or branched alkylene group having 1 to 14 carbon atoms represented by $SP^1$ and $SP^2$ in Formula (I), a methylene group, an ethylene group, a propylene group, or a butylene group is preferable.

The polymerizable group represented by $L^1$ and $L^2$ in Formula (I) is not particularly limited, and a radically polymerizable group (a group capable of radical polymerization) or a cationically polymerizable group (a group capable of cationic polymerization) is preferable.

A preferable range of the radically polymerizable group is as described above.

On the other hand, in Formula (I), Ar represents any aromatic ring selected from the group consisting of the following Formulae (Ar-1) to (Ar-5). In the following Formulae (Ar-1) to (Ar-5), *1 represents a binding site to $D^1$, and *2 represents a binding site to $D^2$.

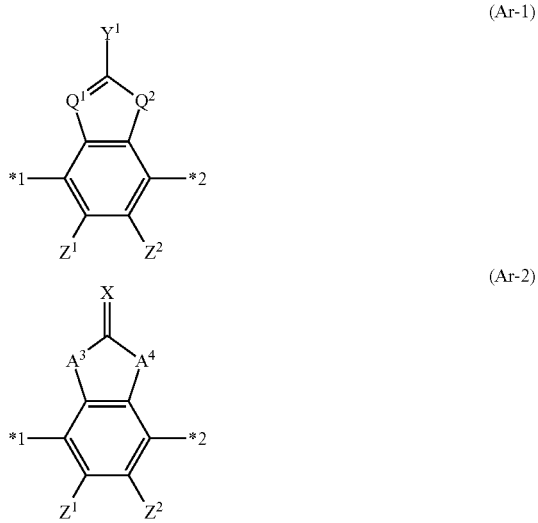

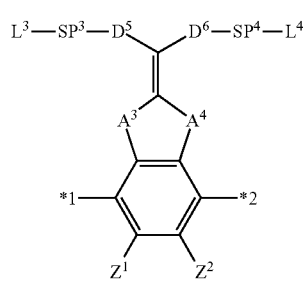

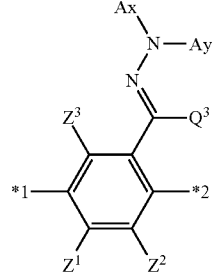

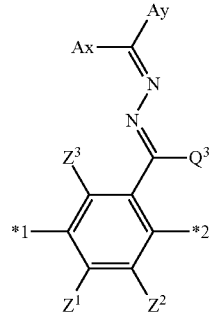

Here, in Formula (Ar-1), $Q_1$ represents N or CH, $Q^2$ represents —S—, —O—, or —N($R^5$)—, and $R^5$ represents a hydrogen atom or an alkyl group having 1 to 6 carbon atoms. $Y^1$ represents an aromatic hydrocarbon group having 6 to 12 carbon atoms which may have a substituent or an aromatic heterocyclic group having to 3 to 12 carbon atoms.

Examples of the alkyl group having 1 to 6 carbon atoms represented by $R^5$ include a methyl group, an ethyl group, a propyl group, an isopropyl group, an n-butyl group, an isobutyl group, a sec-butyl group, a tert-butyl group, an n-pentyl group, and an n-hexyl group.

Examples of the aromatic hydrocarbon group having 6 to 12 carbon atoms represented by $Y^1$ include a phenyl group, a 2,6-diethylphenyl group, and an aryl group such as a naphthyl group.

Examples of the aromatic heterocyclic group having 3 to 12 carbon atoms represented by $Y^1$ include a thienyl group, a thiazolyl group, a furyl group, a pyridyl group, and a heteroaryl group such as a benzofuryl group. The aromatic heterocyclic group include a group in which a benzene ring and an aromatic heterocycle are fused.

In addition, examples of the substituent which may be included in $Y^1$ include an alkyl group, an alkoxy group, a nitro group, an alkylsulfonyl group, an alkyloxycarbonyl group, a cyano group, and a halogen atom.

As the alkyl group, a linear, branched, or cyclic alkyl group having 1 to 18 carbon atoms is preferable, an alkyl group having 1 to 8 carbon atoms (for example, a methyl group, an ethyl group, a propyl group, an isopropyl group, an n-butyl group, an isobutyl group, a sec-butyl group, a t-butyl group, or a cyclohexyl group) is more preferable, an alkyl group having 1 to 4 carbon atoms is still more preferable, and a methyl group or an ethyl group is still more preferable.

As the alkoxy group, for example, an alkoxy group having 1 to 18 carbon atoms is preferable, an alkoxy group having 1 to 8 carbon atoms (for example, a methoxy group, an ethoxy group, an n-butoxy group, or a methoxyethoxy group) is more preferable, an alkoxy group having 1 to 4 carbon atoms is still more preferable, and a methoxy group or an ethoxy group is still more preferable.

Examples of the halogen atom include a fluorine atom, a chlorine atom, a bromine atom, and an iodine atom. Among these, a fluorine atom or a chlorine atom is preferable.

In addition, in Formulae (Ar-1) to (Ar-5), $Z^1$, $Z^2$, and $Z^3$ each independently represent a hydrogen atom, a monovalent aliphatic hydrocarbon group having 1 to 20 carbon atoms, an monovalent alicyclic hydrocarbon group having 3 to 20 carbon atoms, a monovalent aromatic hydrocarbon group having 6 to 20 carbon atoms, a halogen atom, a cyano group, a nitro group, —$NR^6R^7$, or —$SR^8$. $R^6$ to $R^8$ each independently represent a hydrogen atom or an alkyl group having 1 to 6 carbon atoms, and $Z^1$ and $Z^2$ may be bonded to each other to form a ring. The ring may be any one of an alicyclic ring, a heterocycle, or an aromatic ring and is preferably an aromatic ring. The formed ring may be substituted with a substituent.

As the monovalent aliphatic hydrocarbon group having 1 to 20 carbon atoms, an alkyl group having 1 to 15 carbon atoms is preferable, an alkyl group having 1 to 8 carbon atoms is more preferable, a methyl group, an ethyl group, an isopropyl group, a tert-pentyl group (1,1-dimethylpropyl group), a tert-butyl group, or a 1,1-dimethyl-3,3-dimethylbutyl group is still more preferable, and a methyl group, an ethyl group, or a tert-butyl group is still more preferable.

Examples of the monovalent alicyclic hydrocarbon group having 3 to 20 carbon atoms include: a monocyclic saturated hydrocarbon group such as a cyclopropyl group, a cyclobutyl group, a cyclopentyl group, a cyclohexyl group, a cycloheptyl group, a cyclooctyl group, a cyclodecyl group, a methylcyclohexyl group, or an ethylcyclohexyl group; a monocyclic unsaturated hydrocarbon group such as a cyclobutenyl group, a cyclopentenyl group, a cyclohexenyl group, a cycloheptenyl group, a cyclooctenyl group, a cyclodecenyl group, a cyclopentadienyl group, a cyclohexadienyl group, a cyclooctadienyl group, or a cyclodecadiene group; and a polycyclic saturated hydrocarbon group such as a bicyclo[2.2.1]heptyl group, a bicyclo[2.2.2]octyl group, a tricyclo[5.2.1.0$^{2.6}$]decyl group, a tricyclo[3.3.1.1.$^{3.7}$]decyl group, a tetracyclo[6.2.1.1$^{3.6}$.0$^{2.7}$]dodecyl group, or an adamantyl group.

Examples of the monovalent aromatic hydrocarbon group having 6 to 20 carbon atoms include a phenyl group, a 2,6-diethylphenyl group, a naphthyl group, and a biphenyl group. In particular, an aryl group (in particular, a phenyl group) having 6 to 12 carbon atoms is preferable.

Examples of the halogen atom include a fluorine atom, a chlorine atom, a bromine atom, and an iodine atom. Among these, a fluorine atom, a chlorine atom, or a bromine atom is preferable.

On the other hand, examples of the alkyl group having 1 to 6 carbon atoms represented by $R^6$ to $R^8$ include a methyl group, an ethyl group, a propyl group, an isopropyl group, an n-butyl group, an isobutyl group, a sec-butyl group, a tert-butyl group, an n-pentyl group, and an n-hexyl group.

In addition, in Formulae (Ar-2) and (Ar-3), $A^3$ and $A^4$ each independently represent a group selected from the group consisting of —O—, —N($R^9$)—, —S—, and —CO—, and $R^9$ represents a hydrogen atom or a substituent.

Examples of the substituent represented by $R^9$ are the same as those of the substituent which may be included in $Y^1$ in Formula (Ar-1).

In addition, in Formula (Ar-2), X represents a non-metal atom in Group 14 to Group 16 which may be bonded to a hydrogen atom or a substituent.

In addition, examples of the non-metal atom in Group 14 to Group 16 represented by X include an oxygen atom, a sulfur atom, a nitrogen atom having a substituent, and a carbon atom having a substituent. Examples of the substituent are the same as those of the substituent which may be included in $Y^1$ in Formula (Ar-1).

In addition, in Formula (Ar-3), $D^5$ and $D^6$ each independently represent a single bond, —O—CO—, —C(=S)O—, —$CR^1$—$R^2$—, —$CR^1R^2$—$CR^3R^4$—, —O—$CR^1R^2$, —$CR^1R^2$—O—$CR^3R^4$—, —CO—O—$CR^1$—$R^2$—, —O—CO—$CR^1$—$R^2$—, —$CR^1R^2$—O—CO—$CR^3R^4$—, —$CR^1R^2$—CO—O—$CR^3R^4$—, —$NR^1$—$CR^2R^3$—, or —CO—$NR^1$—. $R^1$, $R^2$, $R^3$, and $R^4$ each independently represent a hydrogen atom, a fluorine atom, or an alkyl group having 1 to 4 carbon atoms.

In addition, in Formula (Ar-3), $SP^3$ and $SP^4$ each independently represent a single bond, a linear or branched alkylene group having 1 to 12 carbon atoms, or a divalent linking group in which one or more —$CH_2$—3 s forming the linear or branched alkylene group having 1 to 12 carbon atoms are substituted with —O—, —S—, —NH—, —N(Q)-, or —CO—, and Q represents a polymerizable group.

In addition, in Formula (Ar-3), $L^3$ and $L^4$ each independently represent a monovalent organic group (for example, an alkyl group or a polymerizable group), and As described above, at least one of $L^3$ and $L^4$ and $L^1$ and $L^2$ in Formula (I) represents a polymerizable group.

In addition, in Formulae (Ar-4) and (Ar-5), Ax represents an organic group having 2 to 30 carbon atoms that has at least one aromatic ring selected from the group consisting of an aromatic hydrocarbon ring and an aromatic heterocycle.

In addition, in Formulae (Ar-4) and (Ar-5), Ay represents a hydrogen atom, an alkyl group having 1 to 6 carbon atoms which may have a substituent, or an organic group having 2 to 30 carbon atoms that has at least one aromatic ring selected from the group consisting of an aromatic hydrocarbon ring and an aromatic heterocycle.

Here, the aromatic ring represented by Ax and Ay may have a substituent, and Ax and Ay may be bonded to each other to form a ring.

In addition, $Q^3$ represents a hydrogen atom or an alkyl group having 1 to 6 carbon atoms which may have a substituent.

Examples of Ax and Ay are described in paragraphs "0039" to "0095" of WO2014/010325A.

Examples of the alkyl group having 1 to 6 carbon atoms represented by $Q^3$ include a methyl group, an ethyl group, a propyl group, an isopropyl group, an n-butyl group, an isobutyl group, a sec-butyl group, a tert-butyl group, an n-pentyl group, and an n-hexyl group. Examples of the substituent are the same as those of the substituent which may be included in $Y^1$ in Formula (Ar-1).

From the viewpoint of further improving the effects of the present invention, it is preferable that at least one of $A^1$ or $A^2$ represents a cycloalkylene ring having 6 or more carbon atoms, and it is more preferable that one of $A^1$ or $A^2$ represents a cycloalkylene ring having 6 or more carbon atoms.

The content of the liquid crystal compound in the composition is not particularly limited and is preferably 50 mass % or higher and more preferably 70 mass % or higher with respect to the total solid content in the composition. The upper limit is not particularly limited and is 90 mass % or lower in many cases.

The total solid content in the composition does not include the solvent.

Disk-Shaped Liquid Crystal Compound

As the disk-shaped liquid crystal compound, for example, compounds described in JP2007-108732A and JP2010-244038A are preferable.

Figure 13:
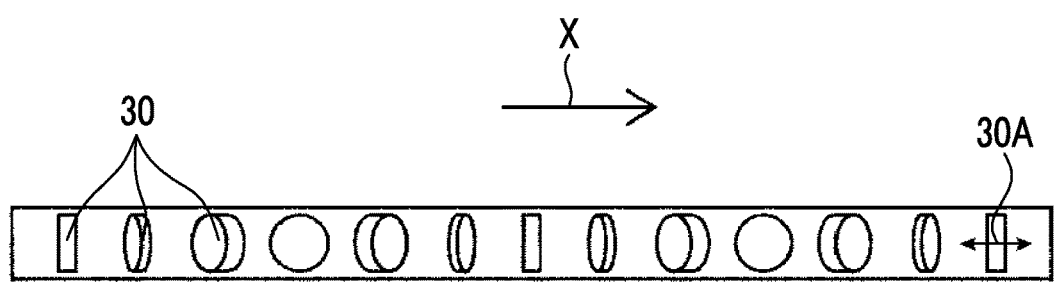
FIG. 13 is a diagram conceptually showing another example of the optically-anisotropic layer of the optical element according to the present invention.

In a case where the disk-shaped liquid crystal compound is used in the optically-anisotropic layer, the liquid crystal compound 30 rises in the thickness direction in the optically-anisotropic layer, and the optical axis 30A derived from the liquid crystal compound is defined as an axis perpendicular to a disk plane, that is so-called, a fast axis (refer to FIG. 13).

Infrared Absorbing Colorant

The infrared absorbing colorant is a colorant that absorbs infrared light (in particular, light in a wavelength range of 700 to 2000 nm). In the infrared absorbing colorant used in the present invention, an absorption of the infrared absorbing colorant in a wavelength range of 700 to 2000 nm in a minor axis direction is higher than an absorption of the infrared absorbing colorant in a wavelength range of 700 to 2000 nm in a major axis direction. That is, the infrared absorbing colorant is a dichroic colorant. The dichroic colorant refers to a colorant having properties in which the absorbance of the molecule in the major axis direction is different from that in the minor axis direction.

"The absorption of the infrared absorbing colorant in a wavelength range of 700 to 2000 nm in the minor axis direction is higher than the absorption of the infrared absorbing colorant in a wavelength range of 700 to 2000 nm in the major axis direction" represents that a maximum absorbance in a wavelength range of 700 to 2000 nm in an absorption spectrum obtained in a case where the infrared absorbing colorant is irradiated with polarized light parallel to the minor axis direction of the infrared absorbing colorant is higher than a maximum absorbance in a wavelength range of 700 to 2000 nm in an absorption spectrum obtained in a case where the infrared absorbing colorant is irradiated with polarized light parallel to the major axis direction of the infrared absorbing colorant.

Examples of a method of measuring the above-described properties of the infrared absorbing colorant include a method of using a sample that is obtained by uniaxially aligning the liquid crystal compound using the composition including the liquid crystal compound and the infrared absorbing colorant. In the above-described sample, the infrared absorbing colorant is aligned such that the major axis of the infrared absorbing colorant is parallel to the alignment direction of the liquid crystal compound. Therefore, by irradiating the sample with polarized light in a direction parallel to the uniaxial alignment direction of the liquid crystal compound, the absorption properties in the major axis direction of the infrared absorbing colorant can be observed, and by irradiating the sample with polarized light in a direction perpendicular to the uniaxial alignment direction of the liquid crystal compound, the absorption properties in the minor axis direction of the infrared absorbing colorant can be observed.

The above-described measurement can be performed using a spectrophotometer (MPC-3100 (manufactured by Shimadzu Corporation)) including an infrared polarizer.

The kind of the infrared absorbing colorant is not particularly limited, and a rod-shaped infrared absorbing colorant having a major axis and a minor axis is preferable.

Examples of the infrared absorbing colorant include a diketo pyrrolo pyrrole colorant, a diimmonium colorant, a phthalocyanine colorant, a naphthalocyanine colorant, an azo colorant, a polymethine colorant, an anthraquinone colorant, a pyrylium colorant, a squarylium colorant, a triphenylmethane colorant, a cyanine colorant, and an aminium colorant.

As the infrared absorbing colorant, one kind may be used alone, or a combination of two or more kinds may be used.

From the viewpoint of further improving the effects of the present invention, the maximum absorption wavelength of the infrared absorbing colorant is positioned preferably in 650 to 1500 nm and more preferably 700 to 1300 nm.

From the viewpoint of further improving the effects of the present invention, it is preferable that an integrated value of absorbance of the infrared absorbing colorant in a wavelength range of 700 to 2000 nm is higher than an integrated value of absorbance of the infrared absorbing colorant in a wavelength range of 400 to 700 nm.

The integrated value of absorbance is a value that is the sum of absorbances at the respective wavelengths in a range of X to Y nm.

The above-described measurement can be performed using a spectrophotometer (MPC-3100 (manufactured by Shimadzu Corporation)).

From the viewpoint of further improving the effects of the present invention, it is preferable that the infrared absorbing colorant has a mesogen group. In a case where the infrared absorbing colorant has a mesogen group, the infrared absorbing colorant is likely to be aligned along with the above-described liquid crystal compound, and the predetermined absorption properties is likely to be controlled.

The mesogen group is a functional group having rigidity and alignment. Examples of a structure of the mesogen group include a structure in which a plurality of groups selected from the group consisting of an aromatic ring group (an aromatic hydrocarbon ring group and an aromatic heterocyclic group) and an alicyclic group are linked to each other directly or a linking group (for example, —O—, —CO—, —C($R^O$)$_2$—, —CH—CH—, —CH=N—, —N=N—, —C=C—, —$NR^O$—, or a combination thereof (for example, —COO—, —CONRO—, —COOCH$_2$CH$_2$—, —CONRCH$_2$CH$_2$—, —OCOCH=CH—, or —C=C—C=C—), $R^O$ represents a hydrogen atom or an alkyl group having 1 to 6 carbon atoms).

Examples of a preferable aspect of the infrared absorbing colorant include a compound represented by Formula (1). In the compound represented by Formula (1), an absorption of the infrared absorbing colorant in a wavelength range of 700 to 2000 nm in a minor axis direction is higher than an absorption of the infrared absorbing colorant in a wavelength range of 700 to 2000 nm in a major axis direction.

In the compound represented by Formula (1), an absorption in a visible range is low, and the coloration of the obtained optically-anisotropic layer is further suppressed. In addition, this compound has a group having a mesogen group, and thus is likely to be aligned along with the liquid crystal compound.

At this time, the group having a mesogen group is disposed to extend horizontally from a fused ring portion having a nitrogen atom present at the center of the compound. Therefore, the above-described fused ring portion is likely to be aligned in a direction perpendicular to the slow axis of the region R of the formed optically-anisotropic layer. That is, an absorption in an infrared range (in particular, in a wavelength of 700 to 2000 nm) derived from the fused ring portion is likely to be obtained in a direction perpendicular to the slow axis of the region R of the optically-anisotropic layer, and an optically-anisotropic layer having the desired properties is likely to be obtained.

Formula (1)

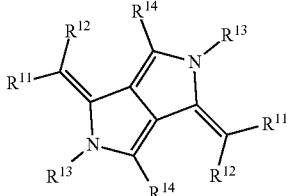

$R^{11}$ and $R^{12}$ each independently represent a hydrogen atom or a substituent, at least one of $R^{11}$ or $R^{12}$ represents an electron-withdrawing group, and $R^{11}$ and $R^{12}$ may be bonded to each other to form a ring. As described below, $R^{11}$ may represent a group having a mesogen group.

Examples of the substituent include an alkyl group, an alkenyl group, an alkynyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, an aromatic heterocyclic thio group, a sulfonyl group, a sulfinyl group, an ureido group, a phosphoric amide group, a hydroxy group, a mercapto group, a halogen atom, a cyano group, a sulfo group, a carboxyl group, a nitro group, a hydroxamic acid group, a sulfino group, a hydrazino group, an imino group, a heterocyclic group (for example, a heteroaryl group), a silyl group, and a group including a combination thereof. The substituent may be further substituted with a substituent.

In addition, examples of the substituent include a group having a mesogen group. The group having a mesogen group will be described below in detail.

The electron-withdrawing group is a substituent having a positive Hammett substituent constant sigma para value (σp value), and examples thereof include a cyano group, an acyl group, an alkyloxycarbonyl group, an aryloxycarbonyl group, a sulfamoyl group, a sulfinyl group, and a heterocyclic group.

These electron-withdrawing groups may further have a substituent.

The Hammett substituent constant σ value will be described. The Hammett rule is an experimental rule proposed by L. P. Hammett in 1935 in order to quantitatively discuss an effect of a substituent on a reaction or an equilibrium of a benzene derivative. The validity of the Hammett rule is widely admitted nowadays. Substituent constants obtained by the Hammett rule are an σp value and an σm value, and these values can be found in many general books. For example, the detail can be found in "Lange's Handbook of Chemistry" 12th edition, edited by J. A. Dean, 1979 (McGraw-Hill), "Kagaku no Ryoiki (Journal of Japanese Chemistry) special edition" vol. 122, pp. 96-103, 1979 (Nankodo), and "Chem. Rev." vol. 91, pp. 165-195, 1991. In the present invention, a substituent having the Hammett's substituent constant σp value of 0.20 or more is preferable as the electron-withdrawing group. The σp value is preferably 0.25 or more, more preferably 0.30 or more, and still more preferably 0.35 or more. The upper limit is not particularly limited and is preferably 0.80 or less.

Specific examples of the substituent having a Hammett σp value of 0.2 or higher include a cyano group (0.66), a carboxyl group (—COOH: 0.45), an alkoxycarbonyl group (—COOMe: 0.45), an aryloxycarbonyl group (—COOPh: 0.44), a carbamoyl group (—CONH$_2$: 0.36), an alkylcarbonyl group (—COMe: 0.50), an arylcarbonyl group (—COPh: 0.43), an alkylsulfonyl group (—SO2Me: 0.72), and an arylsulfonyl group (for example, —SO$_2$Ph: 0.68).

In the present specification, Me represents a methyl group, and Ph represents a phenyl group. The values in the parentheses are representative σp values of the substituents extracted from "Chem. Rev." vol. 91, pp. 165-195, 1991. Each of the substituents according to the present invention is limited by a Hammett substituent constant σp value or will be described using a Hammett substituent constant σp value. In this case, the substituents are not only limited to those whose constants are known in the above-described references. It is needless to say that even substituents whose constants are not known in the references are also included in the substituents according to the present invention as long as the constants of the substituents measured according to Hammett rule fall within the defined range.

In a case where $R^{11}$ and $R^{12}$ are bonded to each other to form a ring, it is preferable that the formed ring is a 5- to 7-membered (preferably 5- or 6-membered) ring which is typically used as an acid nucleus in a merocyanine colorant.

It is preferable that the ring which is formed by $R^{11}$ and $R^{12}$ being bonded to each other is a 1,3-dicarbonyl nucleus, a pyrazolinone nucleus, a 2,4,6-triketohexahydropyrimidine (including a thioketone form), a 2-thio-2,4-thiazolidinedione nucleus, a 2-thio-2,4-oxazolidinedione nucleus, a 2-thio-2,5-thiazolidinedione nucleus, a 2,4-thiazolidinedione nucleus, a 2,4-imidazolidinedione nucleus, a 2-thio-2,4-imidazolidinedione nucleus, a 2-imidazolin-5-one nucleus, a 3,5-pyrazolidinedione nucleus, a benzothiophen-3-one nucleus, or an indanone nucleus.

$R^{11}$ represents preferably a heterocyclic group and more preferably an aromatic heterocyclic group. The heterocyclic group may be monocyclic or polycyclic. As the heterocyclic group, a pyrazole ring group, a thiazole ring group, an oxazole ring group, an imidazole ring group, an oxadiazole ring group, a thiadiazole ring group, a triazole ring group, a pyridine ring group, a pyridazine ring group, a pyrimidine ring group, a pyrazine ring group, a benzo fused ring group thereof (for example, a benzothiazole ring group or a benzopyrazine ring group), a naphtho fused ring group, or a fused ring complex thereof is preferable.

The heterocyclic group may be substituted with a substituent. Examples of the substituent include the examples of the substituent represented by $R^{11}$ and $R^{12}$.

$R^{13}$'s each independently represent a hydrogen atom, an alkyl group, an aryl group, a heteroaryl group, a substituted boron atom (—B(Ra)$_2$, Ra represents a substituent), or a metal atom and may form a covalent bond or a coordinate bond with $R^{11}$.

The substituent of the substituted boron atom represented by $R^{13}$ has the same definition as that described above regarding $R^{11}$ and $R^{12}$, and is preferably an alkyl group, an aryl group, or a heteroaryl group. The substituent of the substituted boron atom (for example, the alkyl group, the aryl group, or the heteroaryl group) may be further substituted with a substituent. Examples of the substituent include the examples of the substituent represented by $R^{11}$ and $R^{12}$.

In addition, as the metal atom represented by $R^{13}$, a transition metal atom, a magnesium atom, an aluminum atom, a calcium atom, a barium atom, a zinc atom, or a tin atom is preferable, and an aluminum atom, a zinc atom, a tin atom, a vanadium atom, an iron atom, a cobalt atom, a nickel atom, a copper atom, a palladium atom, an iridium atom, or a platinum atom is more preferable.

$R^{14}$'s each independently represent a group having a mesogen group. The definition of the mesogen group is as described above.

It is preferable that $R^{14}$ represents a group represented by Formula (2). * represents a binding site.

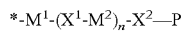  Formula (2)

$M^1$ represents a substituted or unsubstituted arylene group or a substituted or unsubstituted heteroarylene group. Examples of the arylene group include a phenylene group. Examples of the heteroarylene group include a pyrazole ring, a thiazole ring, an oxazole ring, an imidazole ring, an oxadiazole ring, a thiadiazole ring, a triazole ring, a pyridine ring, a pyridazine ring, a pyrimidine ring, a pyrazine ring, a benzo fused ring thereof (for example, a benzothiazole ring or a benzopyrazine ring), a naphtho fused ring, and a divalent group obtained by removing any two hydrogen atoms from a fused ring complex thereof. In a case where the arylene group and the heteroarylene group have a substituent, examples of the substituent include the examples of the substituent represented by $R^{11}$ and $R^{12}$.

$X^1$ represents a single bond, —O—, —CO—, —C($R^0$)$_2$—, —CH=CH—, —CH=N—, —N=N—, —C≡C—, —NR$^0$—, or a combination thereof (for example, —COO—, —CONRO—, —COOCH$_2$CH$_2$—, —CONRCH$_2$CH$_2$—, —OCOCH=CH—, or —C=C—C=C—). $R^0$ represents a hydrogen atom or an alkyl group having 1 to 5 carbon atoms.

$M^2$ represents a substituted or unsubstituted arylene group, a substituted or unsubstituted heteroarylene group, or a substituted or unsubstituted cycloalkylene group. Examples of the arylene group include a phenylene group. Examples of the heteroarylene group include a pyrazole ring, a thiazole ring, an oxazole ring, an imidazole ring, an oxadiazole ring, a thiadiazole ring, a triazole ring, a pyridine ring, a pyridazine ring, a pyrimidine ring, a pyrazine ring, a benzo fused ring thereof (for example, a benzothiazole ring or a benzopyrazine ring), a naphtho fused ring, and a divalent group obtained by removing any two hydrogen atoms from a fused ring complex thereof. The number of carbon atoms in the cycloalkylene group is preferably 5 to 7. In a case where the arylene group, the heteroarylene group, and the cycloalkylene group have a substituent, examples of the substituent include the examples of the substituent represented by $R^{11}$ and $R^{12}$.

$X^2$ represents a single bond or a divalent linking group. Examples of the divalent linking group include a divalent hydrocarbon group (for example, a divalent aliphatic hydrocarbon group such as an alkylene group having 1 to 10 carbon atoms, an alkenylene group having 1 to 10 carbon atoms, or an alkynylene group having 1 to 10 carbon atoms, or a divalent aromatic hydrocarbon group such as an arylene group), a divalent heterocyclic group, —O—, —S—, —NH—, —N(Q)-, —CO—, and a group including a combination thereof (for example, -O-divalent hydrocarbon group-, -(O-divalent hydrocarbon group)$_m$-O— (m represents an integer of 1 or more), or -divalent hydrocarbon group-O-CO—). Q represents a hydrogen atom or an alkyl group.

n represents 1 to 10. In particular, n represents preferably 1 to 5 and more preferably 2 to 4.

P represents a hydrogen atom or a polymerizable group. The definition of the polymerizable group is the same as that of the polymerizable group which may be included in the liquid crystal compound described below.

It is more preferable that the infrared absorbing colorant is a compound represented by Formula (3).

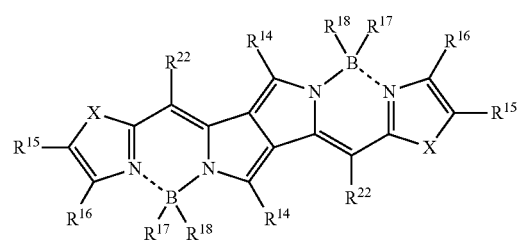  Formula (3)

The definition of $R^{14}$ is as described above.

$R^{22}$'s each independently represent a cyano group, an acyl group, an alkoxycarbonyl group, an alkylsulfinyl group, an arylsulfinyl group, or a nitrogen-containing heteroaryl group.

$R^{15}$ and $R^{16}$ each independently represent a hydrogen atom, an alkyl group, an alkoxy group, an aryl group, or a heteroaryl group, and $R^{15}$ and $R^{16}$ may be bonded to each other to form a ring. Examples of the formed ring include an alicyclic ring having 5 to 10 carbon atoms, an aromatic hydrocarbon ring having 6 to 10 carbon atoms, and an aromatic heterocycle having 3 to 10 carbon atoms. The ring which is formed by $R^{15}$ and $R^{16}$ being bonded to each other to form a ring may be further substituted with a substituent. Examples of the substituent include the examples of the substituent represented by $R^{11}$ and $R^{12}$.

$R^{17}$ and $R^{18}$ each independently represent an alkyl group, an alkoxy group, an aryl group, or a heteroaryl group. The groups represented by $R^{17}$ and $R^{18}$ may be further substituted with a substituent. Examples of the substituent include the examples of the substituent represented by $R^{11}$ and $R^{12}$.

X's each independently represent an oxygen atom, a sulfur atom, —NR—, —CRR'—, —CH=CH—, or —N=CH—, and R and R' each independently represent a hydrogen atom, an alkyl group, or an aryl group.

The content of the infrared absorbing colorant in the composition is not particularly limited, and is preferably 5% to 70 mass % and more preferably 10% to 50 mass % with respect to the total mass of the liquid crystal compound from the viewpoint of further improving the effects of the present invention.

Synthesis of Infrared Absorbing Colorant IR-A

For example, a synthesis scheme of an infrared absorbing colorant IR-A will be shown below.

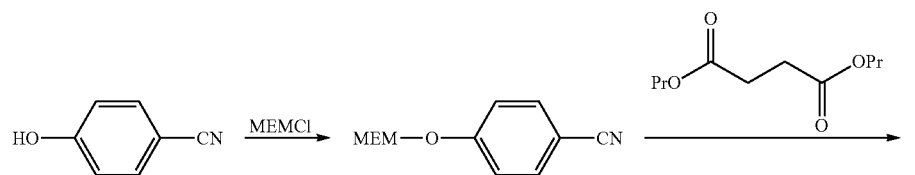
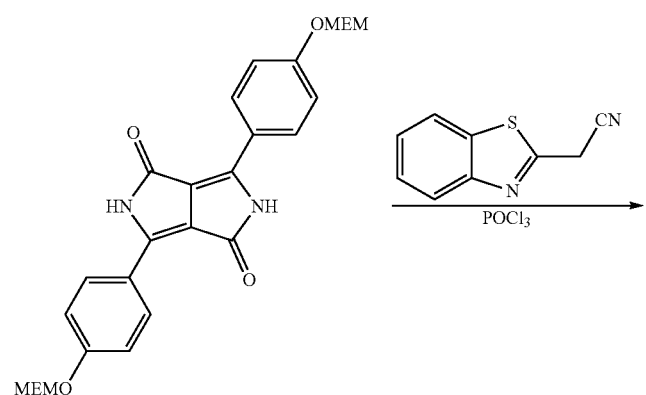
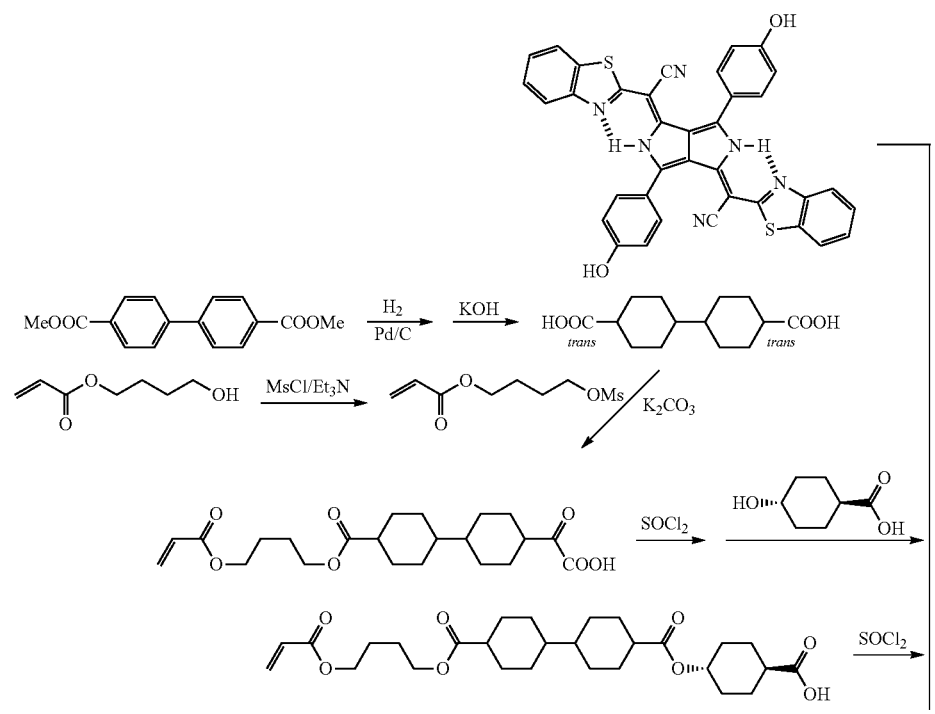

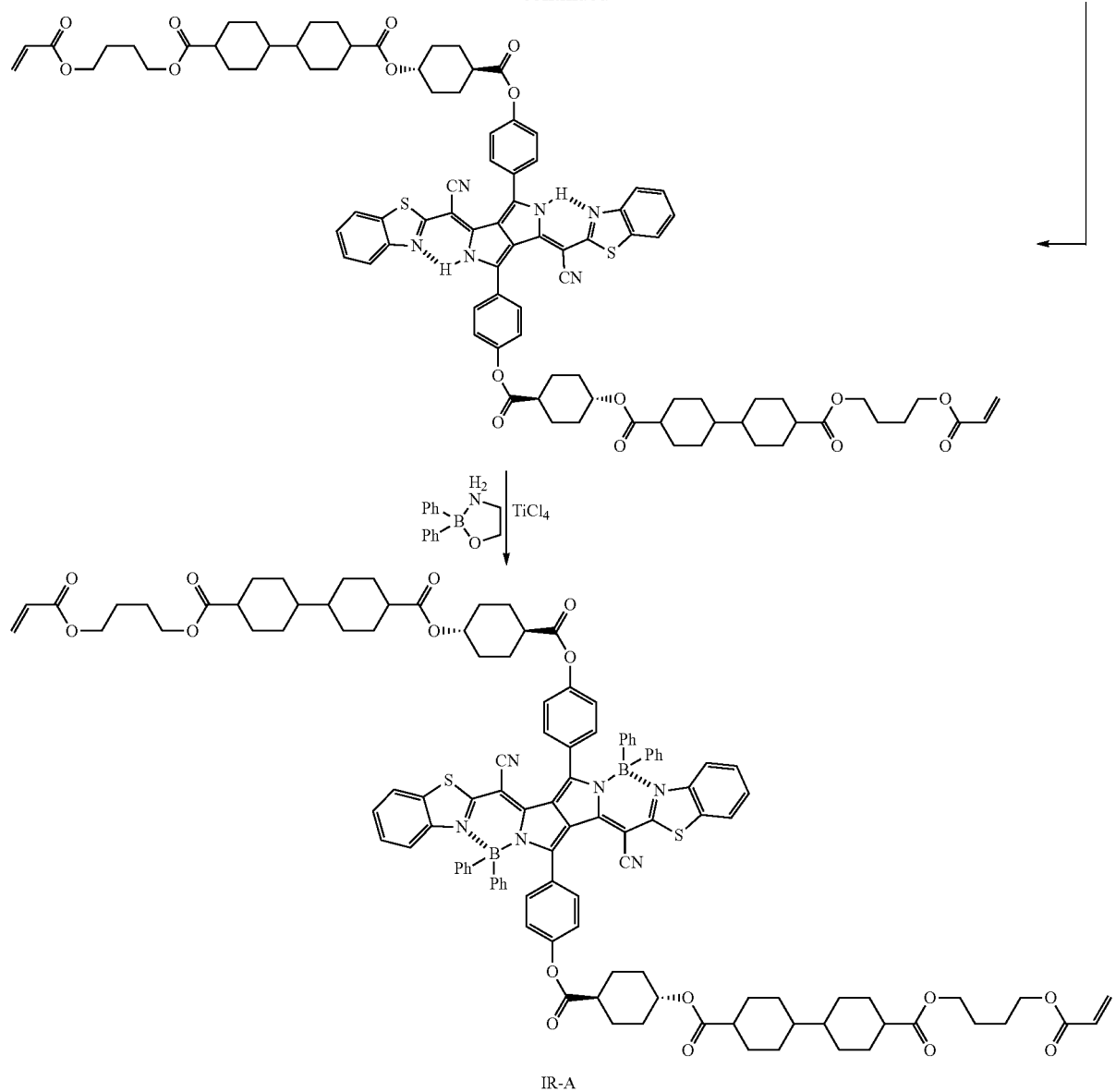

IR-A

The infrared absorbing colorant IR-A is synthesized according to the above-described scheme with reference to JP2011-068731A.

Other Components

The above-described composition may include components other than the liquid crystal compound and the infrared absorbing colorant.

The composition may include a polymerization initiator. The polymerization initiator to be used is selected depending on the type of the polymerization reaction, and examples thereof include a thermal polymerization initiator and a photopolymerization initiator. Examples of the photopolymerization initiator as the polymerization initiator include an α-carbonyl compound, acyloin ether, an α-hydrocarbon-substituted aromatic acyloin compound, a polynuclear quinone compound, and a combination of a triarylimidazole dimer and p-aminophenyl ketone.

The content of the polymerization initiator in the composition is preferably 0.01% to 20 mass % and more preferably 0.5% to 10 mass % with respect to the total solid content of the composition.

In addition, the composition may include a polymerizable monomer.

Examples of the polymerizable monomer include a radically polymerizable compound or a cationically polymerizable compound. In particular, a polyfunctional radically polymerizable monomer is preferable. In addition, as the polymerizable monomer, a monomer which is copolymerizable with the liquid crystal compound having a polymerizable group is preferable. Examples of the polymerizable monomer include compounds described in paragraphs "0018" to "0020" in JP2002-296423A.

The content of the polymerizable monomer in the composition is preferably 1% to 50 mass % and more preferably 2% to 30 mass % with respect to the total mass of the liquid crystal compound.

In addition, the composition may include a surfactant.

Examples of the surfactant include a well-known compound of the related art. In particular, a fluorine compound is preferable. Examples of the surfactant include a compound described in paragraphs "0028" to "0056" of JP2001-330725A and a compound described in paragraphs "0069" to "0126" of JP2003-295212A.

In addition, the composition may include a solvent. As the solvent, an organic solvent is preferable. Examples of the organic solvent include amides (for example, N,N-dimethylformamide), sulfoxides (for example, dimethyl sulfoxide), heterocyclic compounds (for example, pyridine), hydrocarbons (for example, benzene or hexane), alkyl halides (for example, chloroform or dichloromethane), esters (for example, methyl acetate, ethyl acetate, or butyl acetate), ketones (for example, acetone or methyl ethyl ketone), and ethers (for example, tetrahydrofuran or 1,2-dimethoxyethane). Two or more organic solvents may be used in combination.

In addition, the composition may include various alignment controllers such as a vertical alignment agent or a horizontal alignment agent. These alignment controllers are compounds that can control horizontal or vertical alignment of the liquid crystal compound on an interface side.

Further, the composition may include an adherence improving agent, a plasticizer or a polymer other than the above-described components.

<Effect of Optical Element>

As described above, the optically-anisotropic layer that is formed using the composition including the liquid crystal compound and has the liquid crystal alignment pattern in which the direction of the optical axis 30A rotates in the arrow X direction refracts circularly polarized light, in which the intensity of transmitted light of refract light depends on an in-plane retardation $Re(\lambda)=\Delta n_\lambda \times d$ of the optically-anisotropic layer with respect to incidence light at the wavelength $\lambda$ nm. Specifically, in a case where $\Delta n_\lambda \times d=\lambda/2$, incidence light of circularly polarized light having the wavelength $\lambda$ nm can be refracted and transmitted most efficiently, that is, the brightness of transmitted light can be increased to the maximum. Birefringence wavelength dispersion properties of a general liquid crystal compound tends to deviate from an ideal curve. Therefore, even in a case where an in-plane retardation of an optically-anisotropic layer is set to $\lambda/2$ at a specific wavelength, the in-plane retardation deviate from $\lambda/2$. Therefore, the intensity of transmitted light of refracted light varies depending on the wavelength of the light. Accordingly, in a case where incidence light is red light, green light, and blue light and the thickness of the optically-anisotropic layer is adjusted to adjust the in-plane retardation such that the green light is $\lambda/2$, the intensity of transmitted light of refracted light of green light is the strongest, and the intensity of transmitted light of refracted light of red light and blue light is weak. That is, the brightness of transmitted light of green light is high, and the brightness of transmitted light of red light and blue light is low.

Therefore, for example, in a light guide plate of AR glasses, in a case where the optical element that includes the optically-anisotropic layer having the above-described liquid crystal alignment pattern in which the direction of the optical axis 30A rotates is used as a diffraction element for incidence and emission of light into and from the light guide plate, in the case of a full color image, the brightness values of transmitted light of red light, green light, and blue light are different from each other.

On the other hand, the optical element according to the embodiment of the present invention comprises: an optically-anisotropic layer that is formed using a composition including a liquid crystal compound and an infrared absorbing colorant, in which the optically-anisotropic layer has a liquid crystal alignment pattern in which a direction of an optical axis derived from the liquid crystal compound changes while continuously rotating in at least one in-plane direction, and an absorption of the infrared absorbing colorant in a wavelength range of 700 to 2000 nm in a minor axis direction is higher than an absorption of the infrared absorbing colorant in a wavelength range of 700 to 2000 nm in a major axis direction.

In the optical element according to the embodiment of the present invention, light can be transmitted and emitted in a state where the wavelength dependence of the intensity of transmitted light is reduced. Therefore, by using the optical element according to the embodiment of the present invention (for example, an optical element 32 described below) as a diffraction element for incidence of light from a light guide plate and/or as a diffraction element for emission of light into a light guide plate, for example, in AR glasses, a red image, a green image, and a blue image can be propagated, and an appropriate image having a small wavelength dependence of the brightness of transmitted light can be displayed to a user.

Hereinafter, the effects of the optical element 10 will be described in detail.

As described above, in the optical element 10, the first optically-anisotropic member 12 including the first optically-anisotropic layer 26A is provided.

For example, the optical element 10 refracts incidence light to be transmitted in a predetermined direction, the incidence light including circularly polarized light of blue light, circularly polarized light of green light, and circularly polarized light of red light.

In the optical element 10, by using the infrared absorbing colorant having the predetermined properties as described above, the birefringence $\Delta n_\lambda$ that is the difference between the extraordinary light refractive index ne and the ordinary light refractive index no further increases in a long wavelength range, and the optical properties of birefringence can be approximated to the ideal curve.

Here, the thickness of the region R of the first optically-anisotropic layer 26A is adjusted to adjust the in-plane retardation $\Delta n \times d$ such that green light (550 nm) is $\lambda/2$, the brightness of transmitted light of refracted green light increases as described above. In addition, by using the infrared absorbing colorant in the first optically-anisotropic layer 26A, the in-plane retardation $\Delta n_{650} \times d$ of the region R of the first optically-anisotropic layer 26A with respect to red light (650 nm) is approximated to $\lambda/2$ as compared to a case where the infrared absorbing colorant is not used. Therefore, the brightness of transmitted light of refracted red light can be increased.

In addition, in the optical element 10, by using the infrared absorbing colorant having the predetermined properties, the birefringence $\Delta n_\lambda$ that is the difference between the extraordinary light refractive index ne and the ordinary light refractive index no increases.

By using the infrared absorbing colorant in the first optically-anisotropic layer 26A such that the birefringence $\Delta n_\lambda$ increases, the brightness of transmitted light of refracted light increases. By using the infrared absorbing colorant, $\Delta n_{650}$ of red light (650 nm) in a long wavelength range further increases as compared to a case where the infrared absorbing colorant is not used. Therefore, the brightness of transmitted light of refracted red light can be increased.

Further, in the optical element 10, by using the liquid crystal compound showing reverse wavelength dispersion properties as the liquid crystal compound of the first optically-anisotropic layer 26A, the birefringence Δn decreases in a short wavelength range, and the optical properties of birefringence can be approximated to the ideal curve.

Here, the thickness of the region R of the first optically-anisotropic layer 26A is adjusted to adjust the in-plane retardation Δna × d such that green light (550 nm) is λ/2, the brightness of transmitted light of refracted green light increases as described above. In addition, by using the liquid crystal compound showing reverse wavelength dispersion properties in the region R of the first optically-anisotropic layer 26A, the birefringence Δn decreases in a short wavelength range as compared to a liquid crystal compound showing forward wavelength dispersion properties, the in-plane retardation $\Delta n_{650} \times d$ of the region R of the first optically-anisotropic layer 26A with respect to blue light (450 nm) is also approximated to λ/2 as compared to a case where a liquid crystal compound showing forward wavelength dispersion properties is used. Therefore, the brightness of transmitted light of refracted blue light can be increased.

This way, in the optical element 10 according to the embodiment of the present invention, by approximating the optical properties of birefringence to the ideal curve, light can be transmitted and emitted in a state where the wavelength dependence of the intensity of transmitted light is reduced.

In addition, in the optical element according to the embodiment of the present invention, as the optically-anisotropic layer that is formed using the composition including the liquid crystal compound and has the liquid crystal alignment pattern in which the direction of the optical axis 30A rotates in the arrow X direction, a cholesteric liquid crystal layer obtained by immobilizing a cholesteric liquid crystalline phase may be used. That is, the first optically-anisotropic layer 26A may be a layer formed of the liquid crystal compound 30 (liquid crystal material) having a cholesteric structure.

It is known that the cholesteric liquid crystalline phase exhibits selective reflection properties at a specific wavelength. The center wavelength λ of selective reflection (selective reflection center wavelength λ) depends on a pitch P (=helical period) of a helical structure in the cholesteric liquid crystalline phase and satisfies a relationship of λ=n×P with an average refractive index n of the cholesteric liquid crystalline phase. Therefore, the selective reflection center wavelength can be adjusted by adjusting the pitch of the helical structure.

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

In addition, a half-width Δλ (nm) of a selective reflection range (circularly polarized light reflection range) where selective reflection is exhibited depends on Δn of the cholesteric liquid crystalline phase and the helical pitch P and complies with a relationship of Δλ=Δn×P. Therefore, the width of the selective reflection range can be controlled by adjusting Δn.

In the optical element according to the embodiment of the present invention, in the optical element 10, by using the infrared absorbing colorant having the predetermined properties, the birefringence $\Delta n_\lambda$ that is the difference between the extraordinary light refractive index ne and the ordinary light refractive index no can be further increased in a long wavelength range.

For example, by adjusting the selective reflection center wavelength of the cholesteric liquid crystal layer as the first optically-anisotropic layer 26A to red light (650 nm), the birefringence $\Delta n_{650}$ can be increased. Therefore, the half-width of the selective reflection range can be widened as compared to a case where the infrared absorbing colorant is not used.

This way, in the optical element 10 according to the embodiment of the present invention, by using the cholesteric liquid crystal layer as the optically-anisotropic layer, the half-width of the selective reflection range can be widened in an optical element that can reflect light at an angle in a predetermined direction with respect to specular reflection. That is, light can be reflected in a state where the wavelength dependence of the intensity of reflected light is reduced.

In the optical element according to the embodiment of the present invention, the single period Λ in the liquid crystal alignment pattern of the optically-anisotropic layer is not particularly limited and may be appropriately set depending on the use of the optical element and the like.

Here, the optical element according to the embodiment of the present invention and a light guide plate can form a light guide element. For example, the optical element according to the embodiment of the present invention can be suitably used as, for example, a diffraction element that refracts light displayed by a display to be introduced into a light guide plate in AR glasses or a diffraction element that refracts light propagated in a light guide plate to be emitted to an observation position by a user from the light guide plate. In particular, the optical element 32 that can handle with a full color image can be suitably used as a diffraction element in AR glasses.

At this time, in order to totally reflect light from the light guide plate, it is necessary to refract light to be introduced into the light guide plate at a large angle to some degree with respect to incidence light. In addition, in order to reliably emit light propagated in the light guide plate, it is necessary to refract light at a large angle to some degree with respect to incidence light.

In addition, as described above, regarding the transmission angle of light through the optically-anisotropic layer, the angle of transmitted light with respect to incidence light can be increased by reducing the single period Λ in the liquid crystal alignment pattern.

In consideration of this point, the single period Λ in the liquid crystal alignment pattern of the optically-anisotropic layer is preferably 50 μm or less, more preferably 10 μm or less, and still more preferably 3 μm or less.

In consideration of the accuracy of the liquid crystal alignment pattern and the like, the single period Λ in the liquid crystal alignment pattern of the optically-anisotropic layer is preferably 0.1 μm or more.

In the optical elements shown in FIGS. 1 to 5, the optical axis 30A of the liquid crystal compound 30 in the liquid crystal alignment pattern of the optically-anisotropic layer continuously rotates only in the arrow X direction.

However, the present invention is not limited thereto, and various configurations can be used as long as the optical axis 30A of the liquid crystal compound 30 in the optically-anisotropic layer continuously rotates in the in-plane direction.

Figure 10:
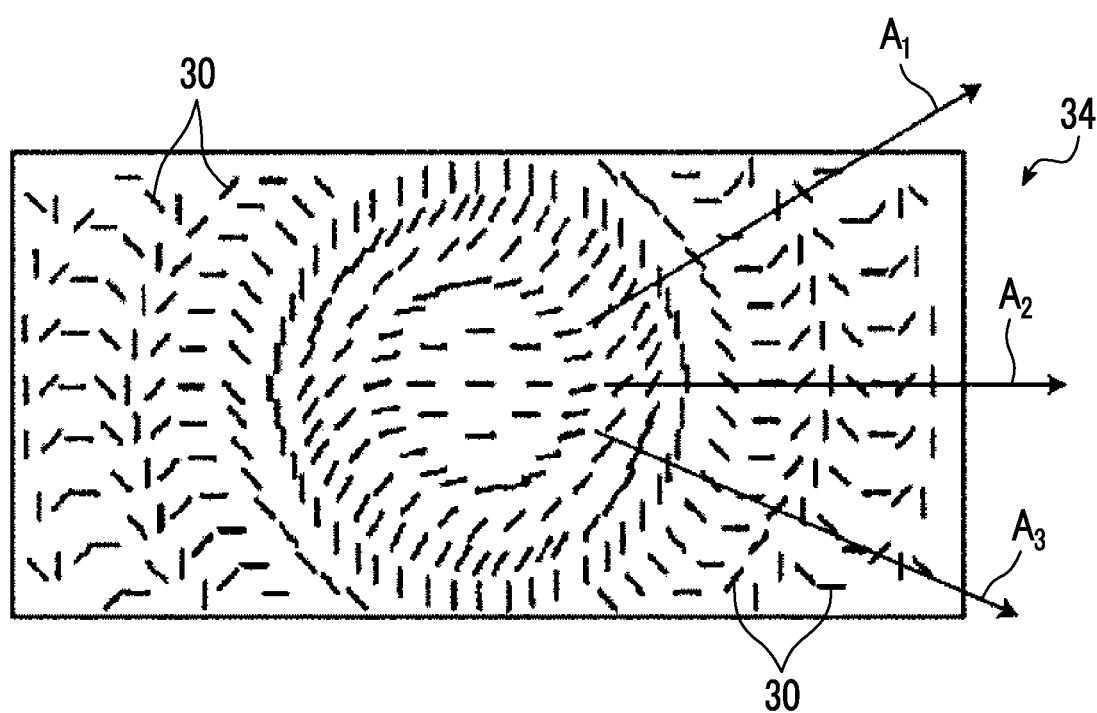
FIG. 10 is a plan view showing another example of the optically-anisotropic layer of the optical element according to the present invention.

For example, an optically-anisotropic layer 34 conceptually shown in a plan view of FIG. 10 can be used, in which a liquid crystal alignment pattern is a concentric circular pattern having a concentric circular shape where the in-plane direction in which the direction of the optical axis of the liquid crystal compound 30 changes while continuously rotating moves from an inside toward an outside. In other words, the liquid crystal alignment pattern of the optically-anisotropic layer 34 shown in FIG. 10 is a liquid crystal alignment pattern where the in-plane direction in which the direction of the optical axis of the liquid crystal compound 30 changes while continuously rotating is provided in a radial shape from the center of the optically-anisotropic layer 34.

FIG. 10 shows only the liquid crystal compound 30 of the surface of the alignment film as in FIG. 4. However, as shown in FIG. 2, the optically-anisotropic layer 34 has the structure in which the liquid crystal compound 30 on the surface of the alignment film is laminated as described above.

In addition, the optically-anisotropic layer 34 also includes the infrared absorbing colorant (not shown).

In the optically-anisotropic layer 34 shown in FIG. 10, the optical axis (not shown) of the liquid crystal compound 30 is a longitudinal direction of the liquid crystal compound 30.

In the optically-anisotropic layer 34, the direction of the optical axis of the liquid crystal compound 30 changes while continuously rotating in a direction in which a large number of optical axes move to the outside from the center of the optically-anisotropic layer 34, for example, a direction indicated by an arrow A1, a direction indicated by an arrow A2, a direction indicated by an arrow A3, or. . . .

In circularly polarized light incident into the optically-anisotropic layer 34 having the above-described liquid crystal alignment pattern, the absolute phase changes depending on individual local regions having different directions of optical axes of the liquid crystal compound 30. At this time, the amount of change in absolute phase varies depending on the directions of the optical axes of the liquid crystal compound 30 into which circularly polarized light is incident.

This way, in the optically-anisotropic layer 34 having the concentric circular liquid crystal alignment pattern, that is, the liquid crystal alignment pattern in which the optical axis changes while continuously rotating in a radial shape, transmission of incidence light can be allowed as diverging light or converging light depending on the rotation direction of the optical axis of the liquid crystal compound 30 and the direction of circularly polarized light to be incident.

That is, by setting the liquid crystal alignment pattern of the optically-anisotropic layer in a concentric circular shape, the optical element according to the embodiment of the present invention exhibits, for example, a function as a convex lens or a concave lens.

Here, in a case where the liquid crystal alignment pattern of the optically-anisotropic layer is concentric circular such that the optical element functions as a convex lens, it is preferable that the length of the single period Λ over which the optical axis rotates by 180° in the liquid crystal alignment pattern gradually decreases from the center of the optically-anisotropic layer 34 toward the outer direction in the in-plane direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light gathering power of the optically-anisotropic layer 34 can be improved, and the performance as a convex lens can be improved.

In the present invention, depending on the uses of the optical element such as a concave lens, it is preferable that the length of the single period Λ over which the optical axis rotates by 180° in the liquid crystal alignment pattern gradually decreases from the center of the optically-anisotropic layer 34 toward the outer direction in the in-plane direction by reversing the direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction in the in-plane direction in which the optical axis continuously rotates. As a result, the light diverging power of the optically-anisotropic layer 34 can be improved, and the performance as a concave lens can be improved.

In the present invention, for example, in a case where the optical element is used as a concave lens, it is preferable that the turning direction of incident circularly polarized light is reversed.

In the present invention, in a case where the optical element is made to function as a convex lens or a concave lens, it is preferable that the optical element satisfies the following expression.

$$\Phi(r)=(\pi/\lambda)[(r^2+f^2)^{1/2}-f]$$

Here, r represents a distance from the center of a concentric circle and is represented by the following expression "$r=(x^2+y^2)^{1/2}$". x and y represent in-plane positions, and $(x,y)=(0,0)$ represents the center of the concentric circle. $\Phi(r)$ represents an angle of the optical axis at the distance r from the center, λ represents a wavelength, and f represents a desired focal length.

In the present invention, conversely, the length of the single period Λ in the concentric circular liquid crystal alignment pattern may gradually increase from the center of the optically-anisotropic layer 34 toward the outer direction in the in-plane direction in which the optical axis continuously rotates.

Further, depending on the uses of the optical element such as a case where it is desired to provide a light amount distribution in transmitted light, a configuration in which regions having partially different lengths of the single periods Λ in the in-plane direction in which the optical axis continuously rotates are provided can also be used instead of the configuration in which the length of the single period Λ gradually changes in the in-plane direction in which the optical axis continuously rotates.

Further, the optical element according to the embodiment of the present invention may include: an optically-anisotropic layer in which the single period Λ is uniform over the entire surface; and an optically-anisotropic layer in which regions having different lengths of the single periods Λ are provided. This point is also applicable to a configuration in which the optical axis continuously rotates only in the in-plane direction as shown in FIG. 1 below.

Figure 11:
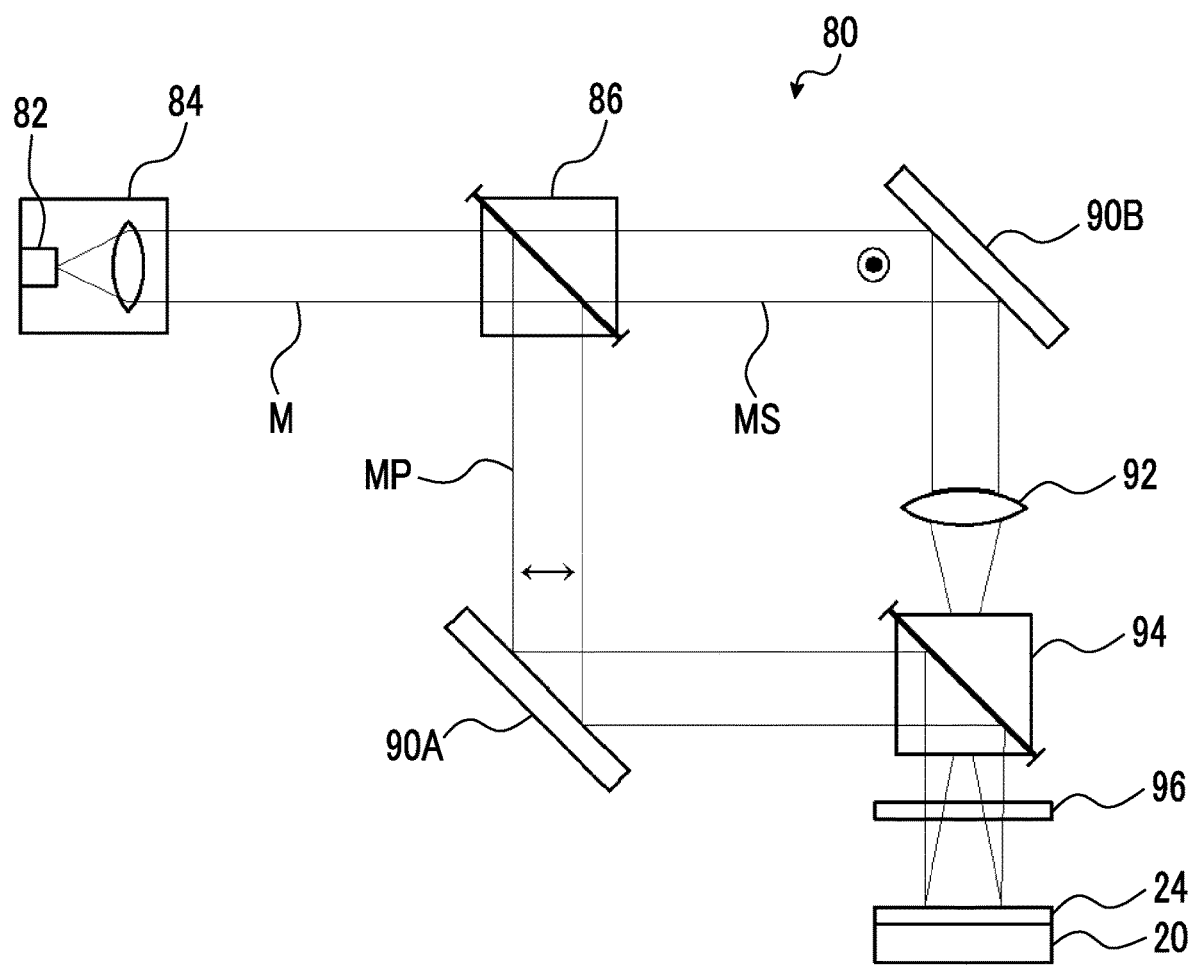
FIG. 11 is a diagram conceptually showing one example of an exposure device that exposes an alignment film forming the optically-anisotropic layer shown in FIG. 10.

FIG. 11 conceptually shows an example of an exposure device that forms the concentric circular alignment pattern in the alignment film (for example, the alignment film 24A).

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is gathered by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 24 on the support 20.

Due to interference between the right circularly polarized light and the left circularly polarized light, the polarization state of light with which the alignment film 24 is irradiated periodically changes according to interference fringes. The intersection angle between the right circularly polarized light and the left circularly polarized light changes from the inside to the outside of the concentric circle. Therefore, an exposure pattern in which the pitch changes from the inside to the outside can be obtained. As a result, in the alignment film 24, a concentric circular alignment pattern in which the alignment state periodically changes can be obtained.

In the exposure device 80, the single period Λ in the liquid crystal alignment pattern in which the optical axis rotates by 180° in the in-plane direction can be controlled by changing the refractive power of the lens 92 (the F number of the lens 92), the focal length of the lens 92, the distance between the lens 92 and the alignment film 24, and the like.

In addition, by adjusting the refractive power of the lens 92 (the F number of the lens 92), the length Λ of the single period in the liquid crystal alignment pattern in the in-plane direction in which the optical axis continuously rotates can be changed.

Specifically, In addition, the length Λ of the single period in the liquid crystal alignment pattern in the in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inside toward the outside, and the F number increases. Conversely, in a case where the refractive power of the lens 92 becomes stronger, the length Λ of the single period in the liquid crystal alignment pattern rapidly decreases from the inside toward the outside, and the F number decreases.

This way, the configuration of changing the length of the single period Λ over which the optical axis rotates by 180° in the in-plane direction in which the optical axis continuously rotates can also be used in the configuration shown in FIGS. 1 to 5 in which the optical axis 30A of the liquid crystal compound 30 continuously rotates only in the in-plane direction as the arrow X direction.

For example, by gradually decreasing the single period Λ of the liquid crystal alignment pattern in the arrow X direction, an optical element that allows transmission of light to be gathered can be obtained. In addition, by reversing the direction in which the optical axis in the liquid crystal alignment pattern rotates by 180°, an optical element that allows transmission of light to be diffused only in the arrow X direction can be obtained. By reversing the turning direction of incident circularly polarized light, an optical element that allows transmission of light to be diffused only in the arrow X direction can be obtained.

Further, depending on the uses of the optical element such as a case where it is desired to provide a light amount distribution in transmitted light, a configuration in which regions having partially different lengths of the single periods Λ in the arrow X direction are provided can also be used instead of the configuration in which the length of the single period Λ gradually changes in the arrow X direction. For example, as a method of partially changing the single period Λ, for example, a method of scanning and exposing the photo-alignment film to be patterned while freely changing a polarization direction of laser light to be gathered can be used.

The optical element according to the embodiment of the present invention can be used for various uses where transmission of light in a direction different from an incidence direction is allowed, for example, an optical path changing member, a light collecting element, a light diffusing element to a predetermined direction, a diffraction element, or the like in an optical device.

Figure 12:
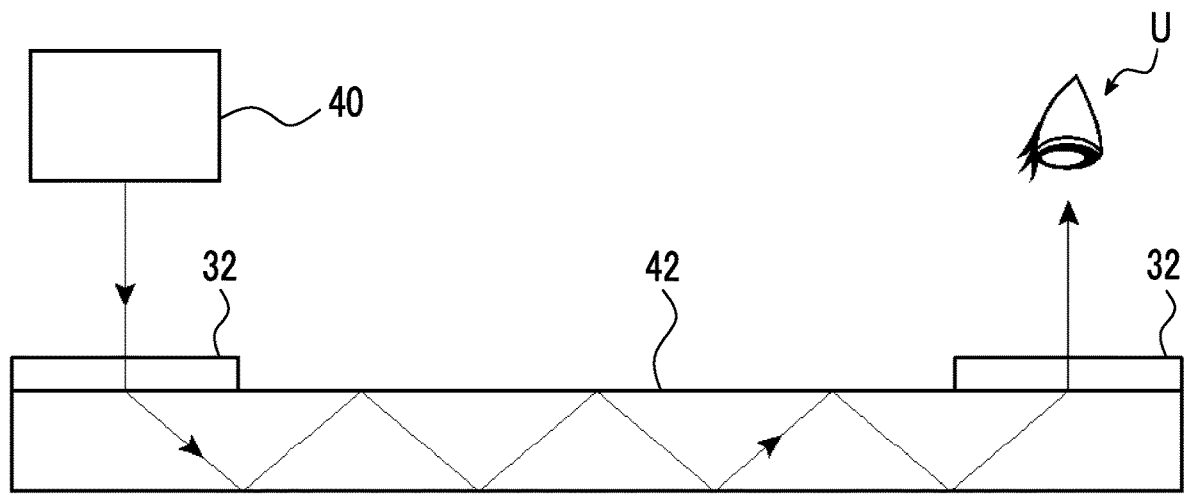
FIG. 12 is a diagram conceptually showing an example of AR glasses including one example of a light guide element according to the present invention.

In a preferable example, as conceptually shown in FIG. 12, two optical elements 32 are prepared and provided to be spaced from each other in the light guide plate 42 such that, light (projection image) emitted from the display 40 can be introduced into the light guide plate 42 at a sufficient angle by total reflection and the light propagated in the light guide plate 42 can be emitted from the light guide plate 42 to an observation position by a user U in the AR glasses.

In the above-described example, the optical element according to the embodiment of the present invention is used as the optical element that allows transmission of visible light or reflects visible light. However, the present invention is not limited to this example, and various configurations can be used.

For example, the optical element according to the embodiment of the present invention also may be configured to allow transmission of infrared light or ultraviolet light or to reflect infrared light or ultraviolet light, or may be configured to allow transmission of light other than visible light or to reflect only light other than visible light.

Hereinabove, the optical element and the light guide element according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of First Optically-Anisotropic Member>
(Support and Saponification Treatment of Support)

As the support, a commercially available triacetyl cellulose film (manufactured by Fujifilm Corporation, Z-TAC) was prepared.

The support was caused to pass through an induction heating roll at a temperature of 60° C. such that the support surface temperature was increased to 40° C.

Next, an alkali solution shown below was applied to a single surface of the support using a bar coater in an application amount of 14 mL (liter)/m², the support was heated to 110° C., and the support was transported for 10 seconds under a steam infrared electric heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated on the obtained support three times, and then the support was transported and dried in a drying zone at 70° for 10 seconds. As a result, the alkali saponification treatment was performed on the surface of the support.

Alkali Solution

| | |
|---|---|
| Potassium hydroxide | 4.70 parts by mass |
| Water | 15.80 parts by mass |
| Isopropanol | 63.70 parts by mass |
| Surfactant | |
| SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

| Undercoat Layer-Forming Coating Solution | |
|---|---|
| The following modified polyvinyl alcohol | 2.40 parts by mass |
| Isopropyl alcohol | 1.60 parts by mass |

| Undercoat Layer-Forming Coating Solution | |
|---|---|
| Methanol | 36.00 parts by mass |
| Water | 60.00 parts by mass |

Modified Polyvinyl Alcohol

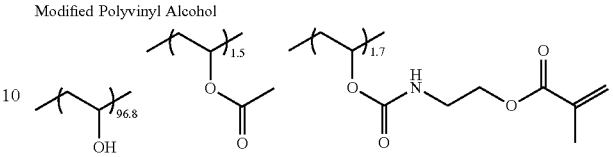

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

| Alignment Film-Forming Coating Solution | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

-Material A for Photo-Alignment- $NaO_2C$ — ⌬ — $N=N$ — ⌬($SO_3Na$) — ⌬($NaO_3S$) — $N=N$ — ⌬($CO_2Na$) — $OH$
$HO$ —

(Exposure of Alignment Film)

The alignment film was exposed using the exposure device shown in FIG. 9 to form an alignment film P-1 having an alignment pattern.

In the exposure device, a laser that emits laser light having a wavelength (325 nm) was used as the laser. The exposure dose of the interference light was 100 mJ/cm². The single period (the length over which the optical axis derived from the liquid crystal compound rotates by 180°) of an alignment pattern formed by interference of two laser beams was controlled by changing an intersection angle (intersection angle α) between the two beams.

(Formation of First Optically-Anisotropic Layer)

As the composition forming the optically-anisotropic layer, the following composition A-1 was prepared.

| Composition A-1 | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |

-continued

| Composition A-1 | |
|---|---|
| Leveling agent T-1 | 0.08 parts by mass |
| Chloroform | 520.00 parts by mass |

Liquid Crystal Compound L-1

[Chemical structure: diacrylate mesogen with two acryloyloxybutoxy-benzoate groups linked via methyl-substituted phenylene diester core] 84%

[Chemical structure: mono-R-substituted analog with one acryloyloxybutoxy-benzoate group] 14%

[Chemical structure: di-R-substituted analog] 2%

R:

[Chemical structure: –O-C(=O)-C6H4-O-(CH2)4-O-C(=O)-CH=CH2]

Leveling Agent T-1

[Chemical structure: $C_6F_{13}$-CH2CH2-O-CH2CH2-O-C6H4-C(=O)-O-(methylphenylene)-O-C(=O)-C6H4-O-CH2CH2-O-CH2CH2-$C_6F_{13}$]

The first optically-anisotropic layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition A-1 was applied to the alignment film P-1 to form a coating film, the coating film was heated using a hot plate at 120° C., the coating film was cooled to 60° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. At this time, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, a first optically-anisotropic layer was formed, and a first optically-anisotropic member was prepared.

The complex refractive index $\Delta n_{550}$ of each of the regions R of the cured layer of the composition A-1 was 0.16. The complex refractive index $\Delta n_{550}$ was obtained by applying the liquid crystal composition Al to a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value and the thickness of the liquid crystal immobilized layer. $\Delta n_{550}$ can be calculated by dividing the retardation value by the thickness. The retardation value was measured at a wavelength of 550 nm using Axoscan (manufactured by Axometrix Inc.), and the thickness was measured using a scanning electron microscope (SEM). Hereinafter, the retardation value was measured appropriately at a desired wavelength.

Finally, in the first optically-anisotropic layer, $\Delta n_{550} \times$ thickness (Re(550)) was 275 nm, and it was verified using a polarizing microscope that periodic alignment occurred on the surface as shown in FIG. 3. In the liquid crystal alignment pattern of the first optically-anisotropic layer, the single period over which the optical axis derived from the liquid crystal compound rotated by 180° was 1.0 μm. In addition $\Delta n_{450} \times$ thickness (Re(450)) was 300 nm, and $\Delta n_{650} \times$ thickness (Re(650)) was 264 nm. Accordingly, $(\Delta n_{450} \times d)/(\Delta n_{550} \times d)$ was 1.09, and $(\Delta n_{650} \times d)/(\Delta n_{550} \times d)$ was 0.96. Hereinafter, unless specified otherwise, "$\Delta n_{550} \times d$" and the like were measured as described above.

Example 1

(Formation of First Optically-Anisotropic Layer)

As the composition forming the optically-anisotropic layer, the following composition A-2 was prepared.

| Composition A-2 | |
| --- | --- |
| Liquid crystal compound L-1 | 100.00 parts by mass |
| Infrared absorbing colorant IR-1 | 5.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Chloroform | 545.00 parts by mass |

Infared absorbing colorant IR-1

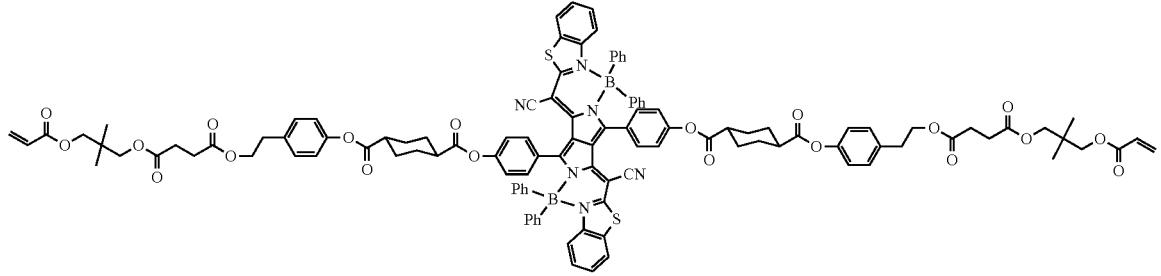

An infrared absorbing colorant IR-1 was synthesized with reference to the scheme of the infrared absorbing colorant IR-A.

A first optically-anisotropic layer was formed using the same method as that of Comparative Example 1, except that the composition A-2 was used.

Finally, in the first optically-anisotropic layer, $\Delta n_{550} \times$ thickness (Re(550)) was 275 nm, and it was verified using a polarizing microscope that periodic alignment occurred on the surface as shown in FIG. 3. In the liquid crystal alignment pattern of the first optically-anisotropic layer, the single period over which the optical axis derived from the liquid crystal compound rotated by 180° was 1.0 μm. In addition $\Delta n_{450} \times$ thickness (Re(450)) was 294 nm, and $\Delta n_{650} \times$ thickness (Re(650)) was 273 nm. Accordingly, $(\Delta n_{450} \times d)/(\Delta n_{550} \times d)$ was 1.07, and $(\Delta n_{650} \times d)/(\Delta n_{550} \times d)$ was 0.99. Here, $\Delta n_{550}$ was 0.17.

An absorption of the infrared absorbing colorant IR-1 in a wavelength range of 700 to 2000 nm in a minor axis direction was higher than an absorption of the infrared absorbing colorant IR-1 in a wavelength range of 700 to 2000 nm in a major axis direction.

In addition, an integrated value of absorbance of the infrared absorbing colorant IR-1 in a wavelength range of 700 to 2000 nm was higher than an integrated value of absorbance of the infrared absorbing colorant IR-1 in a wavelength range of 400 to 700 nm.

A liquid crystal immobilized layer (cured layer) was obtained as an optically-anisotropic layer for the absorption measurement by applying the liquid crystal composition A-2 to a support with an alignment film that was prepared separately, aligning the director of the liquid crystal compound to be parallel to the substrate, irradiating the liquid crystal compound with ultraviolet irradiation for immobilization. Next, an absorption in an infrared light was obtained using a spectrophotometer (MPC-3100 (manufactured by Shimadzu Corporation)) including an infrared polarizer. As a result, it was found that, in a wavelength range of 700 to 2000 nm, an absorption in a direction parallel to the fast axis of the region R of the optically-anisotropic layer was higher than that in a direction parallel to the slow axis.

In addition, the alignment order parameter So of the region R of the optically-anisotropic layer at a maximum absorption wavelength of the infrared absorbing colorant IR-1 was −0.56.

Comparative Example 2

(Formation of First Optically-Anisotropic Layer)

As the composition forming the optically-anisotropic layer, the following composition A-3 was prepared.

| Composition A-3 | |
| --- | --- |
| Liquid crystal compound L-2 | 100.00 parts by mass |
| Polymerization initiator PI-1 | 0.50 parts by mass |

-continued

| Composition A-3 | |
|---|---|
| Leveling agent T-1 | 0.50 parts by mass |
| Chloroform | 510.00 parts by mass |

-Liquid Crystal Compound L-2-

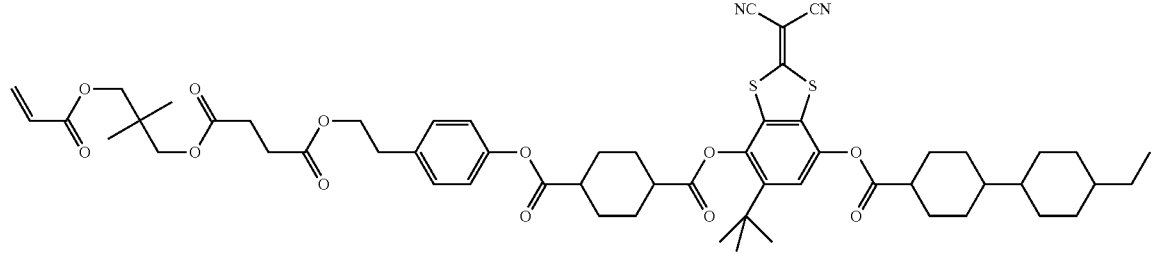

Me Position Isomer Mixture

-Polymerization initiator PI-1-

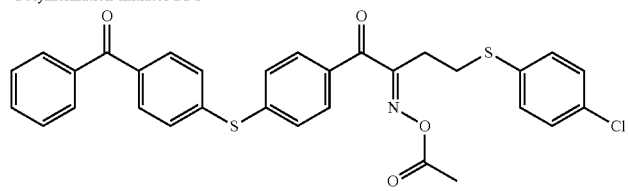

A first optically-anisotropic layer was formed using the same method as that of Comparative Example 1, except that the composition A-3 was used and the coating film was heated using a hot plate at 190° C. and was cooled to 120° C. to immobilize the alignment of the liquid crystal compound.

Finally, in the first optically-anisotropic layer, $\Delta n_{550} \times$ thickness (Re(550)) was 275 nm, and it was verified using a polarizing microscope that periodic alignment occurred on the surface as shown in FIG. 3. In the liquid crystal alignment pattern of the first optically-anisotropic layer, the single period over which the optical axis derived from the liquid crystal compound rotated by 180° was 1.0 µm. In addition $\Delta n_{450} \times$ thickness (Re(450)) was 205 nm, and $\Delta n_{650} \times$ thickness (Re(650)) was 288 nm. Accordingly, $(\Delta n_{450} \times d)/(\Delta n_{550} \times d)$ was 0.74, and $(\Delta n_{650} \times d)/(\Delta n_{550} \times d)$ was 1.05. Here, $\Delta n_{550}$ was 0.042.

Example 2

(Formation of First Optically-Anisotropic Layer)

As the composition forming the optically-anisotropic layer, the following composition A-4 was prepared.

| Composition A-4 | |
|---|---|
| Liquid crystal compound L-2 | 100.00 parts by mass |
| Infrared absorbing colorant IR-1 | 5.00 parts by mass |
| Polymerization initiator PI-1 | 0.50 parts by mass |
| Leveling agent T-1 | 0.50 parts by mass |
| Chloroform | 535.00 parts by mass |

Infared absorbing colorant IR-I

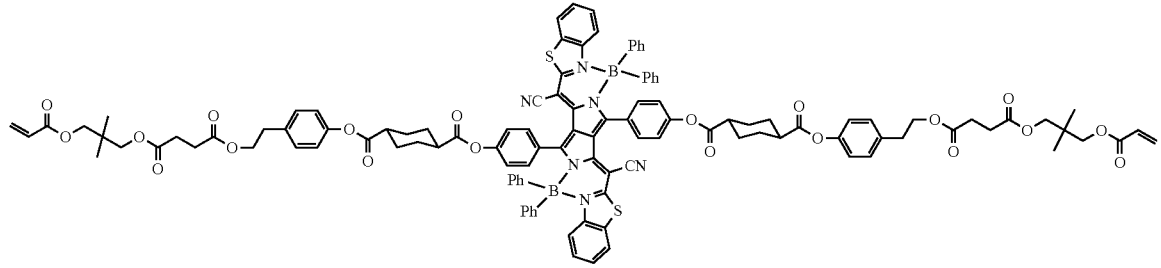

A first optically-anisotropic layer was formed using the same method as that of Comparative Example 2, except that the composition A-4 was used.

Finally, in the first optically-anisotropic layer, $\Delta n_{550} \times$ thickness (Re(550) was 275 nm, and it was verified using a polarizing microscope that periodic alignment occurred on the surface as shown in FIG. 3. In the liquid crystal alignment pattern of the first optically-anisotropic layer, the single period over which the optical axis derived from the liquid crystal compound rotated by 180° was 1.0 µm. In addition $\Delta n_{450} \times$ thickness (Re(450)) was 211 nm, and $\Delta n_{650} \times$ thickness (Re(650)) was 307 nm. Accordingly, $(\Delta n_{450} \times d)/(\Delta n_{550} \times d)$ was 0.77, and $(\Delta n_{650} \times d)/(\Delta n_{550} \times d)$ was 1.12. Here, $\Delta n_{550}$ was 0.045.

In addition, an absorption in an infrared light was obtained using a spectrophotometer (MPC-3100 (manufactured by Shimadzu Corporation)) including an infrared polarizer. As a result, it was found that, in a wavelength range of 700 to 2000 nm, an absorption in a direction parallel to the fast axis of the region R of the optically-anisotropic layer was higher than that in a direction parallel to the slow axis.

In addition, the alignment order parameter $S_0$ of the region R of the optically-anisotropic layer at a maximum absorption wavelength of the infrared absorbing colorant IR-1 was −0.23.

Comparative Example 3

(Formation of Cholesteric Liquid Crystal Layer)

As the composition forming the cholesteric liquid crystal layer, the following composition A-5 was prepared.

This composition A-5 is a composition forming a cholesteric liquid crystal layer (cholesteric liquid crystalline phase) that has a selective reflection center wavelength of 630 nm and reflects right circularly polarized light.

| Composition A-5 | |
| --- | --- |
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 4.69 parts by mass |
| Leveling agent T-1 | 0.08 parts by mass |
| Chloroform | 560.00 parts by mass |

Chiral agent Ch-1

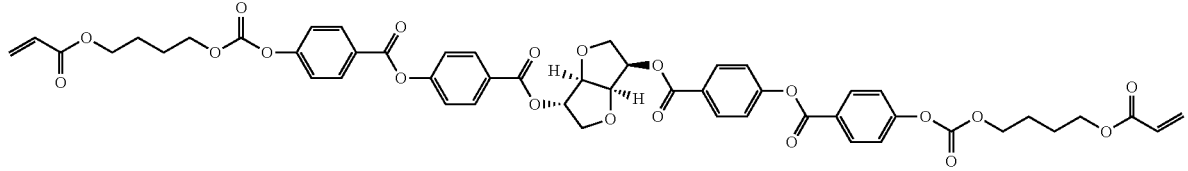 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

A cholesteric liquid crystal layer was formed using the same method as that of the first optically-anisotropic layer according to Comparative Example 1, except that the composition A-5 was used and the coating film was heated using a hot plate at 95° C.

In a case where a cross-section of the reflecting layer was observed with a scanning electron microscope (SEM), the cholesteric liquid crystalline phase of the reflecting layer had 8 pitches.

It was verified using a polarizing microscope that the reflection cholesteric liquid crystal layer had a periodically aligned surface as shown in FIG. 3. In the liquid crystal alignment pattern of the reflection cholesteric liquid crystal layer, the single period over which the optical axis derived from the liquid crystal compound rotated by 180° was 1.0 µm. In addition, $\Delta n_{650}$ was 0.155.

Example 3

(Formation of Cholesteric Liquid Crystal Layer)

As the composition forming the cholesteric liquid crystal layer, the following composition A-6 was prepared.

This composition A-6 is a composition forming a cholesteric liquid crystal layer (cholesteric liquid crystalline phase) that has a selective reflection center wavelength of 630 nm and reflects right circularly polarized light.

Composition A-6

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Infrared absorbing colorant IR-1 | 5.00 parts by mass |
| Chiral agent Ch-1 | 4.69 parts by mass |
| Leveling agent T-1 | 0.08 parts by mass |
| Chloroform | 580.00 parts by mass |

Infared absorbing colorant IR-1

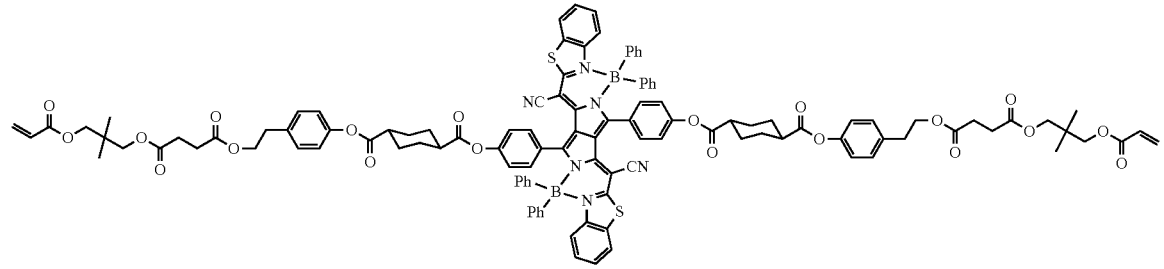

A cholesteric liquid crystal layer was formed using the same method as that of Comparative Example 3, except that the composition A-6 was used.

In a case where a cross-section of the reflecting layer was observed with a scanning electron microscope (SEM), the cholesteric liquid crystalline phase of the reflecting layer had 8 pitches.

It was verified using a polarizing microscope that the reflection cholesteric liquid crystal layer had a periodically aligned surface as shown in FIG. 3. In the liquid crystal alignment pattern of the reflection cholesteric liquid crystal layer, the single period over which the optical axis derived from the liquid crystal compound rotated by 180° was 1.0 µm. In addition, $\Delta n_{630}$ was 0.17.

[Preparation of Circular Polarization Plate]

In order to perform "Measurement of Light Intensity" described below, a circular polarization plate was prepared as described below.

First, the support on which the undercoat layer was formed was prepared using the same method as that of Comparative Example 1.

(Formation of Alignment Film P-10)

The following alignment film P-10-forming coating solution was continuously applied to the support on which the undercoat layer was formed using a #2.4 wire bar. The support on which the coating film of the alignment film P-10-forming coating solution was formed was dried using a hot plate at 80° C. for 5 minutes. As a result, an alignment film P-10 was formed.

| <Alignment Film P-10-Forming Coating Solution> | |
|---|---|
| Material for photo-alignment Polymer A2 | 4.35 parts by mass |
| Low molecular weight compound B2 | 0.80 parts by mass |
| Crosslinking agent C1 | 2.20 parts by mass |
| Compound D1 | 0.48 parts by mass |
| Compound D2 | 1.15 parts by mass |
| Butyl acetate | 100.00 parts by mass |

<<Synthesis of Polymer A2>>

100 parts by mass of 2-(3,4-epoxycyclohexyl)ethyltrimethoxysilane, 500 parts by mass of methyl isobutyl ketone, and 10 parts by mass of triethylamine were charged into a reaction vessel equipped with a stirrer, a thermometer, a dropping funnel, and a reflux cooling pipe and were mixed with each other at room temperature. Next, 100 parts by mass of deionized water was dropped for 30 minutes using a dropping funnel, and a reaction was caused to occur at 80° C. for 6 hours while mixing the components with each other under reflux. After completion of the reaction, the organic phase was extracted and was cleaned with 0.2 mass % ammonium nitrate aqueous solution until water used for cleaning was neutral. Next, by distilling off the solvent and water under reduced pressure, epoxy-containing polyorganosiloxane was obtained as a viscous transparent liquid.

In a case where the epoxy-containing polyorganosiloxane was analyzed by nuclear magnetic resonance ($^1$H-NMR), a peak having a theoretical intensity based on an oxiranyl group was obtained in the vicinity of chemical shift ($\delta$)=3.2 ppm, and it was verified that a side reaction of an epoxy group did not occur during the reaction. In the epoxy-containing polyorganosiloxane, the weight-average molecular weight Mw was 2,200, and the epoxy equivalent was 186 g/mol.

Next, 10.1 parts by mass of the epoxy-containing polyorganosiloxane obtained as described above, 0.5 parts by mass of an acrylic group-containing carboxylic acid (manufactured by Toagosei Co., Ltd., ARONIX M-5300, @-carboxypolycaprolactone monoacrylate (polymerization degree n≈2)), 20 parts by mass of butyl acetate, 1.5 parts by mass of a cinnamic acid derivative obtained using a method of Synthesis Example 1 of JP2015-026050A, and 0.3 parts by mass of tetrabutylammonium bromide were charged into a 100 mL three-neck flask, and were stirred at 90° C. for 12 hours. After completion of the reaction solution was diluted with the same amount (mass) of butyl acetate as that of the reaction solution and was cleaned with water three times.

An operation of concentrating this solution and diluting the concentrated solution with butyl acetate was repeated twice. Finally, a solution including polyorganosiloxane (the following polymer A2) having a photo-alignable group was obtained. In the polymer A2, the weight-average molecular weight Mw was 9,000. In addition, as a result of $^1$H-NMR, the content of a component having a cinnamate group in the polymer A2 was 23.7 mass %.

Polymer A2

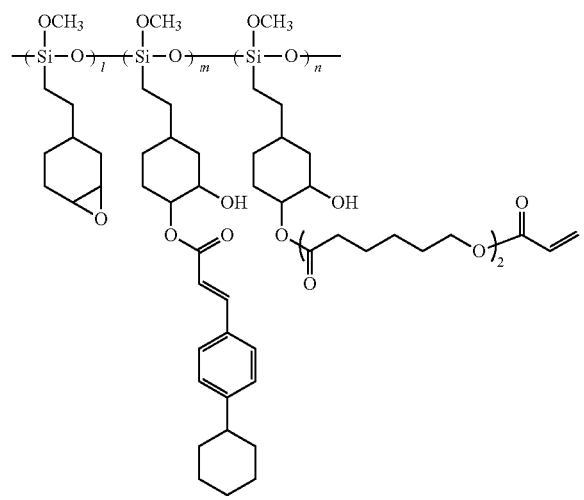

Low Molecular Weight Compound B2

The low molecular weight compound B2 shown in the following table (manufactured by The Nisshin OilliO Group, Ltd., NOMCOAT TAB) was used.

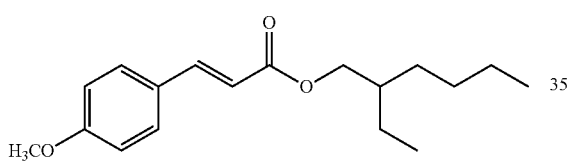

Crosslinking Agent C1

The crosslinking agent C1 (manufactured by Nagase ChemteX Corporation, DENACOL EX411) shown in the following table was used.

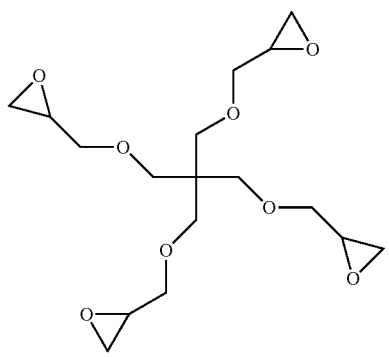

-Compound D1

The following compound D1 (manufactured by Kawaken Fine Chemicals Co., Ltd., ALUMINUM CHELATE A(W)) shown in the following table was used.

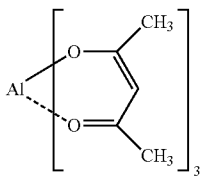

Compound D2

The compound D2 (manufactured by Toyo Science Corp., triphenylsilanol) shown in the following table was used.

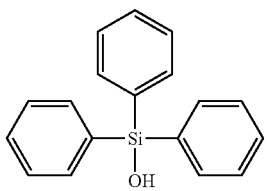

(Exposure of Alignment Film P-10)

By irradiating the obtained alignment film P-10 with polarized ultraviolet light (20 mJ/cm$^2$, using an extra high pressure mercury lamp), the alignment film P-10 was exposed.

[Preparation of Optically-Anisotropic Layer (λ/4 Plate)]

An optically-anisotropic layer was formed by applying a composition C-1 described below to the alignment film P-10. The applied coating film was heated using a hot plate at 110° C., the coating film was cooled to 60° C., and the coating film was irradiated with ultraviolet light having a wavelength of 365 nm at an irradiation dose of 500 mJ/cm$^2$ using a high-pressure mercury lamp in a nitrogen atmosphere. As a result, the alignment of the liquid crystal compound was immobilized, and an optically-anisotropic layer was prepared.

In the obtained optically-anisotropic layer, $\Delta n_{650} \times d$ (Re (650)) was 162.5 nm.

Composition C-1

| | |
|---|---|
| Liquid crystal compound L-3 | 42.00 parts by mass |
| Liquid crystal compound L-4 | 42.00 parts by mass |
| Liquid crystal compound L-5 | 16.00 parts by mass |
| Polymerization initiator PI-1 | 0.50 parts by mass |

| | |
|---|---|
| Leveling agent G-1 | 0.20 parts by mass |
| Methyl ethyl ketone | 176.00 parts by mass |
| Cyclopentanone | 44.00 parts by mass |

-Liquid Crystal Compound L-3-

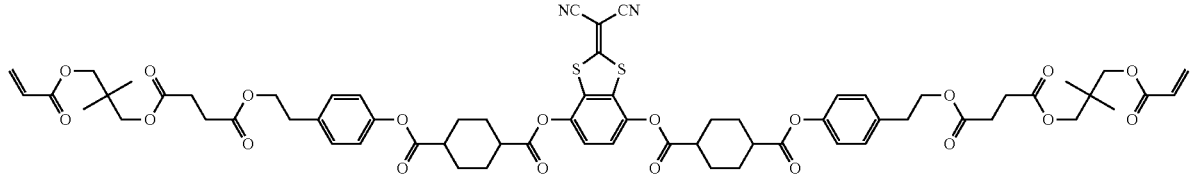

Me Position Isomer Mixture

-Liquid Crystal Compound L-4-

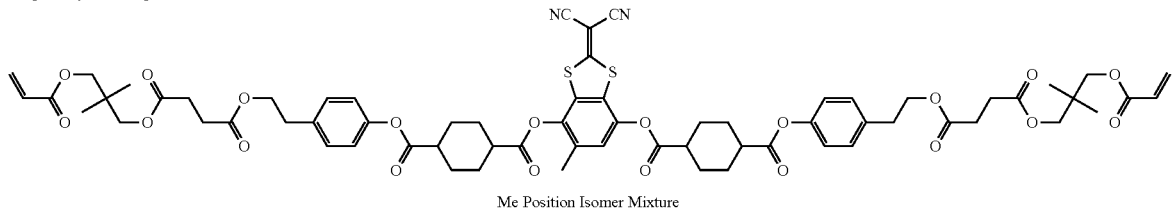

Me Position Isomer Mixture

-Liquid Crystal Compound L-5-

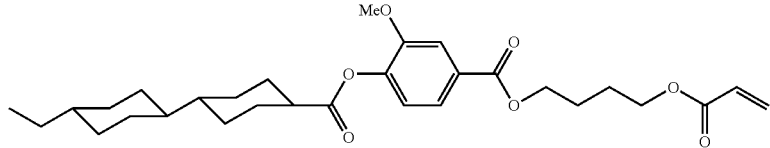 [SMILES: C=CC(=O)OCCCCOC(=O)c1ccc(OC(=O)C2CCC(C3CCC(CC)CC3)CC2)c(OC)c1]

-Polymerization initiator PI-1-

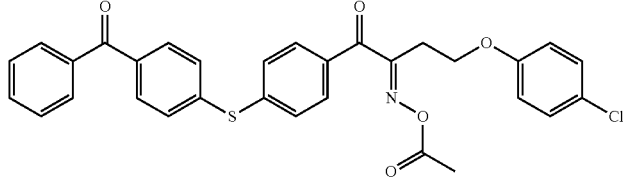 [SMILES: CC(=O)O/N=C(\CCOc1ccc(Cl)cc1)C(=O)c1ccc(Sc2ccc(C(=O)c3ccccc3)cc2)cc1]

-Leveling Agent G-1-

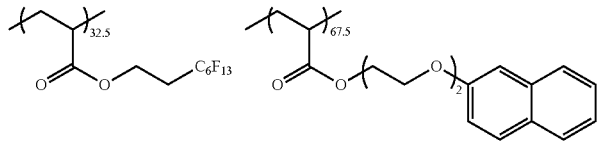

[Preparation of Circular Polarization Plate]

A polarizing plate was bonded to the triacetyl cellulose film side of the optically-anisotropic layer (λ/4 plate) through a pressure sensitive adhesive to obtain a circular polarization plate R.

[Preparation of Circular Polarization Plate]

A circular polarization plate B, a circular polarization plate G, and a circular polarization plate R2 were prepared using the same method as the above-described preparation method of the circular polarization plate, except that the thickness of the optically-anisotropic layer was changed such that $\Delta n_{450} \times d$ (Re(450)) was 112.5 nm, $\Delta n_{530} \times d$ (Re(530)) was 132.5 nm, and $\Delta n_{635} \times d$ (Re(635)) was 158.8 nm.

[Measurement of Light Intensity]

Figure 14:
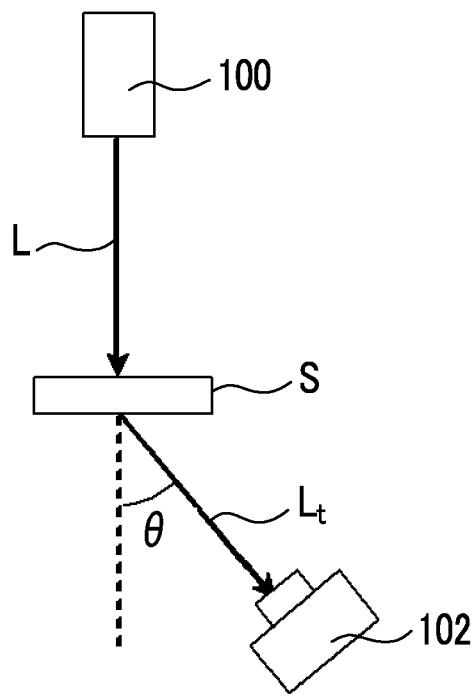
FIG. 14 is a conceptual diagram showing a method of measuring a light intensity.

Using a method shown in FIG. 14, a relative light intensity was measured.

In a case where light was incident into the prepared optical element from the front (direction with an angle of 0° with respect to the normal line), a relative light intensity of transmitted light with respect to the incidence light was measured.

Specifically, laser light L having an output center wavelength in a red light range (650 nm), a green light range (530 nm), and a blue light range (450 nm) was caused to be vertically incident into the prepared optical element S from a light source 100. Transmitted light was captured using a screen disposed at a distance of 100 cm to calculate a transmission angle. The intensity of transmitted light $L_t$ transmitted at a transmission angle θ was measured using a photodetector 102. A ratio between the light intensity of the transmitted light $L_t$ and the light intensity of the light L was obtained to obtain the value of the relative light intensity of the transmitted light $L_t$ relative to the incidence light (laser light L) (transmitted light $L_t$/laser light L). As the transmission angle θ, the transmission angle measured in advance was used.

Laser light was caused to be vertically incident into the circular polarization plate B, the circular polarization plate G, and the circular polarization plate R corresponding to the respective wavelengths to be converted into circularly polarized light, the circularly polarized light was incident into the prepared optical element, and the evaluation was performed.

In Comparative Example 1 and Example 1, the measurement results of relative light intensities of transmitted light in the prepared optical elements relative to incidence light were compared to each other. The relative light intensity of transmitted light in Example 1 was higher than that in Comparative Example 1, and the improvement of the amount of transmitted light was observed. In particular, the improvement of the amount of transmitted light of red light (650 nm) was significant. In addition, a difference between the wavelengths of the relative light intensity of transmitted light in Example 1 was less than that in Comparative Example 1, and the wavelength dependence was improved.

In Comparative Example 2 and Example 2, the measurement results of relative light intensities of transmitted light in the prepared optical elements relative to incidence light were compared to each other. The relative light intensity of transmitted light in Example 2 was higher than that in Comparative Example 2, and the improvement of the amount of transmitted light was observed. In particular, the improvement of the amount of transmitted light with respect to red light (650 nm) was significant. In addition, a difference between the wavelengths of the relative light intensity of transmitted light in Example 2 was less than that in Comparative Example 1, and the wavelength dependence was improved.

Figure 15:
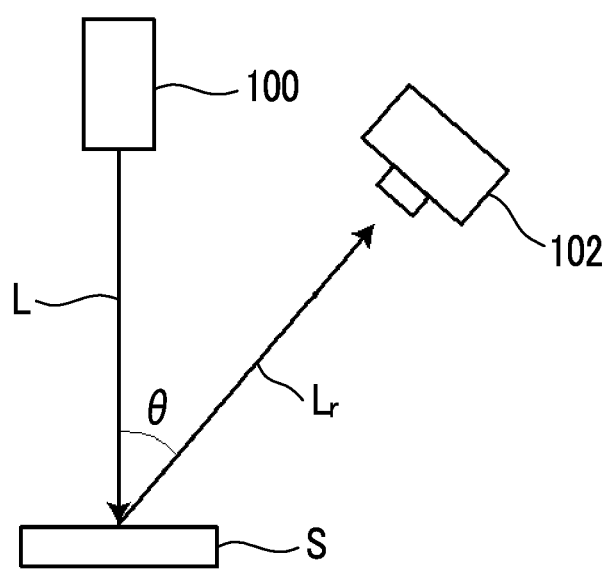
FIG. 15 is a conceptual diagram showing a method of measuring a light intensity.

Using a method shown in FIG. 15, a relative light intensity was measured.

In a case where light was incident into the prepared optical element from the front (direction with an angle of 0° with respect to the normal line), a relative light intensity of reflected light with respect to the incidence light was measured.

Specifically, laser light L having an output center wavelength of 650 nm and 635 nm was caused to be vertically incident from a light source 100 into the prepared optical element S. Reflected light was captured using a screen disposed at a distance of 100 cm to calculate a reflection angle. A light intensity of reflected light Lr reflected on a reflection angle θ was measured using a photodetector 102. A ratio between the light intensity of the reflected light Lr and the light intensity of the light L was obtained to obtain the value of the relative light intensity with respect to the incidence light (laser light L) of the reflected light Lr (reflected light Lr/laser light L). As the reflection angle θ, the reflection angle measured in advance was used.

Laser light was caused to be vertically incident into the circular polarization plate corresponding to the wavelength of the laser light to be converted into circularly polarized light, the circularly polarized light was incident into the prepared optical element, and the evaluation was performed.

In Comparative Example 3 and Example 3, the measurement results of relative light intensities of reflected light in the prepared optical elements relative to incidence light were compared to each other. The relative light intensity of reflected light in Example 3 was higher than that in Comparative Example 3, and the improvement of the amount of reflected light was observed. In particular, the amount of light reflected at 650 nm was improved, a difference between the wavelengths of the relative light intensity of reflected light was small, and the wavelength dependence was improved.

As can be seen from the table, the predetermined optical element can allow transmission of light or reflect light in a state where the wavelength dependence of the intensity of transmitted light or reflected light is reduced.

As can be seen from the above results, the effects of the present invention are obvious.

The present invention is suitably applicable to various uses where light is refracted in an optical device, for example, a diffraction element that causes light to be incident into a light guide plate of AR glasses or emits light to the light guide plate.

EXPLANATION OF REFERENCES

10, 32: optical element
12: first optically-anisotropic member
20: support
24A: alignment film
26A: first optically-anisotropic layer
30: liquid crystal compound
30A: optical axis
34: optically-anisotropic layer
40: display
42: light guide plate
60, 80: exposure device
62, 82: laser
65: λ/2 plate
64, 84: light source
68: beam splitter
70A, 70B, 90A, 90B: mirror
72A, 72B, 96: λ/4 plate
86, 94: polarization beam splitter
92: lens
M: laser light
MA. MB: beam
MP: P polarized light
MS: S polarized light
$P_O$: linearly polarized light
$P_R$: right circularly polarized light
$P_L$: left circularly polarized light
Q1, Q2: absolute phase
E1, E2: equiphase surface
U: user

What is claimed is:

1. An optical element comprising:
   an optically-anisotropic layer that is formed using a composition including a liquid crystal compound and an infrared absorbing colorant,
   wherein the optically-anisotropic layer has a liquid crystal alignment pattern in which a direction of an optical axis derived from the liquid crystal compound changes while continuously rotating in at least one in-plane direction,
   an absorption of the infrared absorbing colorant in a wavelength range of 700 to 2000 nm in a minor axis direction is higher than an absorption of the infrared absorbing colorant in a wavelength range of 700 to 2000 nm in a major axis direction, and
   the liquid crystal compound is cholesterically aligned in a thickness direction.

2. The optical element according to claim 1,
   wherein an integrated value of absorbance of the infrared absorbing colorant in a wavelength range of 700 to 2000 nm is higher than an integrated value of absorbance of the infrared absorbing colorant in a wavelength range of 400 to 700 nm.

3. The optical element according to claim 1,
wherein the infrared absorbing colorant is a compound represented by Formula (1),

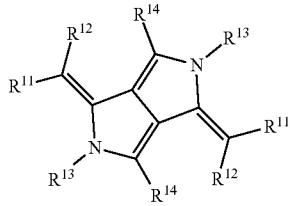

Formula (1)

$R^{11}$ and $R^{12}$ each independently represent a hydrogen atom or a substituent,
at least one of $R^{11}$ or $R^{12}$ represents an electron-withdrawing group,
$R^{11}$ and $R^{12}$ may be bonded to each other to form a ring, $R^{13}$'s each independently represent a hydrogen atom, an alkyl group, an aryl group, a heteroaryl group, a substituted boron atom, or a metal atom and may form a covalent bond or a coordinate bond with $R^{11}$, and $R^{14}$'s each independently represent a group having a mesogen group.

4. The optical element according to claim 1,
wherein in a case where a length over which the direction of the optical axis derived from the liquid crystal compound rotates by 180° in a plane is set as a single period, the optically-anisotropic layer has regions having different lengths of the single periods in the liquid crystal alignment pattern.

5. The optical element according to claim 1,
wherein the length of the single period in the liquid crystal alignment pattern gradually decreases in the in-plane direction in which the direction of the optical axis derived from the liquid crystal compound changes while continuously rotating in the liquid crystal alignment pattern.

6. The optical element according to claim 1,
wherein the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

7. The optical element according to claim 1, comprising a plurality of optically-anisotropic layers,
wherein the optically-anisotropic layers have different directions in which the optical axis is twisted in a thickness direction of the optically-anisotropic layer and rotates.

8. The optical element according to claim 1,
wherein the length of the single period in the liquid crystal alignment pattern is 50 µm or less.

9. A light guide element comprising:
the optical element according to claim 1; and
a light guide plate.

10. The optical element according to claim 2,
wherein the infrared absorbing colorant is a compound represented by Formula (1),

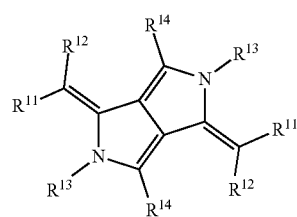

Formula (1)

$R^{11}$ and $R^{12}$ each independently represent a hydrogen atom or a substituent,
at least one of $R^{11}$ or $R^{12}$ represents an electron-withdrawing group,
$R^{11}$ and $R^{12}$ may be bonded to each other to form a ring, $R^{13}$'s each independently represent a hydrogen atom, an alkyl group, an aryl group, a heteroaryl group, a substituted boron atom, or a metal atom and may form a covalent bond or a coordinate bond with $R^{11}$, and $R^{14}$'s each independently represent a group having a mesogen group.

11. The optical element according to claim 2,
wherein in a case where a length over which the direction of the optical axis derived from the liquid crystal compound rotates by 180° in a plane is set as a single period, the optically-anisotropic layer has regions having different lengths of the single periods in the liquid crystal alignment pattern.

12. The optical element according to claim 2,
wherein the length of the single period in the liquid crystal alignment pattern gradually decreases in the in-plane direction in which the direction of the optical axis derived from the liquid crystal compound changes while continuously rotating in the liquid crystal alignment pattern.

13. The optical element according to claim 2,
wherein the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

14. The optical element according to claim 2, comprising a plurality of optically-anisotropic layers,
wherein the optically-anisotropic layers have different directions in which the optical axis is twisted in a thickness direction of the optically-anisotropic layer and rotates.

15. The optical element according to claim 2,
wherein the length of the single period in the liquid crystal alignment pattern is 50 µm or less.

16. A light guide element comprising:
the optical element according to claim 2; and
a light guide plate.

* * * * *